(12) United States Patent
Lee et al.

(10) Patent No.: US 12,261,316 B2
(45) Date of Patent: Mar. 25, 2025

(54) BATTERY TRANSPORTING APPARATUS

(71) Applicant: LG ENERGY SOLUTION, LTD., Seoul (KR)

(72) Inventors: Dong-Hee Lee, Daejeon (KR); Sung-Guk Hong, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 557 days.

(21) Appl. No.: 17/637,353

(22) PCT Filed: May 13, 2020

(86) PCT No.: PCT/KR2020/006290
§ 371 (c)(1),
(2) Date: Feb. 22, 2022

(87) PCT Pub. No.: WO2021/071043
PCT Pub. Date: Apr. 15, 2021

(65) Prior Publication Data
US 2022/0294063 A1    Sep. 15, 2022

(30) Foreign Application Priority Data
Oct. 8, 2019   (KR) .................. 10-2019-0124813

(51) Int. Cl.
*H01M 50/256*   (2021.01)
*B65D 25/10*   (2006.01)
(Continued)

(52) U.S. Cl.
CPC .......... *H01M 50/256* (2021.01); *B65D 25/10* (2013.01)

(58) Field of Classification Search
CPC .................. H01M 50/256; B65D 25/10
(Continued)

(56) References Cited

U.S. PATENT DOCUMENTS

2012/0233850 A1*   9/2012   Hozumi .................. B60L 50/66
29/729

FOREIGN PATENT DOCUMENTS

CN        107380658 A    11/2017
CN        207417434 U     5/2018
(Continued)

OTHER PUBLICATIONS

Extended European Search Report for European Application No. 20874109.0, dated Sep. 9, 2022.
(Continued)

*Primary Examiner* — Christian Roldan
*Assistant Examiner* — Robert Gene West
(74) *Attorney, Agent, or Firm* — Birch, Stewart, Kolasch & Birch, LLP

(57) ABSTRACT

Disclosed is a battery transporting apparatus including a frame member for supporting a battery cell; a pair of electrode lead support members movably mounted to the frame member to be adjustable in a length direction of the battery cell among length, width and thickness directions of the battery cell and for supporting electrode leads of the battery cell, respectively; a cell support member movably mounted to the frame member to be adjustable in the thickness direction of the battery cell for supporting a center portion of the battery cell; and a frame supporting adjustable member coupled to a lower side of the frame member to be adjustable in the width direction.

12 Claims, 19 Drawing Sheets

(51) Int. Cl.
*H01M 10/0525* (2010.01)
*H01M 50/105* (2021.01)

(58) Field of Classification Search
USPC .......................................................... 429/99
See application file for complete search history.

(56) References Cited

FOREIGN PATENT DOCUMENTS

| | | | |
|---|---|---|---|
| CN | 109449496 A | | 3/2019 |
| JP | 2012-192783 A | | 10/2012 |
| KR | 20-0133692 Y1 | | 3/1999 |
| KR | 1999-0024942 U | | 7/1999 |
| KR | 100541922 B1 | * | 10/2004 |
| KR | 10-2010-0044418 A | | 4/2010 |
| KR | 10-2011-0091061 A | | 8/2011 |
| KR | 10-2013-0079738 A | | 7/2013 |
| KR | 10-2015-0144608 A | | 12/2015 |
| KR | 20170114852 A | * | 4/2016 |
| KR | 10-2017-0114852 A | | 10/2017 |
| KR | 10-2019-0008698 A | | 1/2019 |
| WO | WO 2020/162661 A1 | | 8/2020 |

OTHER PUBLICATIONS

International Search Report for PCT/KR2020/006290 mailed on Aug. 21, 2020.

* cited by examiner

BATTERY TRANSPORTING APPARATUS

TECHNICAL FIELD

The present application claims priority to Korean Patent Application No. 10-2019-0124813 filed on Oct. 8, 2019 in the Republic of Korea, the disclosures of which are incorporated herein by reference.

The present disclosure relates to a battery transporting apparatus, and more particularly, to a battery transporting apparatus adjustable in a length direction, a width direction and a thickness direction of a battery cell.

BACKGROUND ART

As technology development and demand for a mobile device have increased, demand for a secondary battery as an energy source has rapidly increased. Conventionally, a nickel-cadmium battery or a hydrogen ion battery has been used as the secondary battery. However, a lithium secondary battery is recently widely used because charging and discharging is free due to rare memory effect in comparison with a nickel-based secondary battery, a self-discharge rate is very low, and an energy density is high.

The lithium secondary battery mainly uses a lithium oxide and a carbonaceous material as a positive electrode active material and a negative electrode active material, respectively. A secondary battery such as the lithium secondary battery (hereinafter, just referred to as a "battery") includes an electrode assembly in which a positive electrode plate and a negative electrode plate, respectively coated with the positive electrode active material and the negative electrode active material, are arranged with a separator therebetween, and an exterior, that is a battery case, which seals and receives the electrode assembly together with an electrolyte solution.

Meanwhile, in a battery production line, a battery transporting device capable of receiving a large amount of thin batteries upright is used as a means for safely storing and transporting batteries when moving from a process to a process or when shipping finished products.

A conventional battery transporting device has a problem in that it is inconvenient to adjust an interval between main cassettes since a worker directly moves the main cassettes after releasing a bolt and nut and also the worker fixes the bolt and nut again after moving the main cassettes.

In addition, the conventional battery transporting device may be adjusted by a manual operation of the worker as described above only in a length direction of the battery cell among length, width and thickness directions of the battery cell, and it is not possible to adjust the conventional battery transporting device in a thickness direction. Thus, in order to transport battery cells of various thicknesses, battery transporting devices suitable for each thickness of the battery cells must be separately manufactured, which however causes inconvenient work and increased cost.

In addition, since the conventional battery transporting device is not movable in a width direction, namely in a height direction, it is difficult to adjust the height of the battery when charging or discharging the battery for a charging or discharging device with various heights.

DISCLOSURE

Technical Problem

Therefore, the present disclosure is directed to providing a battery transporting apparatus, which may transport battery cells having various sizes in a length direction among length, width and thickness directions of the battery cell by using one transporting device.

In addition, the present disclosure is directed to providing a battery transporting apparatus, which may transport battery cells having various sizes in a thickness direction among length, width and thickness directions of the battery cell by using one transporting device.

In addition, the present disclosure is directed to providing a battery transporting apparatus, which may move in a width direction, namely in a height direction, among length, width and thickness directions of the battery cell.

Technical Solution

In one aspect of the present disclosure, there is provided a battery transporting apparatus, comprising: a frame member configured to support a battery cell; a pair of electrode lead support members movably mounted to the frame member to be adjustable in a length direction of the battery cell among length, width and thickness directions of the battery cell and configured to support electrode leads of the battery cell, respectively; a cell support member movably mounted to the frame member to be adjustable in the thickness direction and configured to support a center portion of the battery cell; and a frame supporting adjustable member coupled to a lower side of the frame member to be adjustable in the width direction of the battery cell.

Also, the battery transporting apparatus may further comprise a lengthwise rotary shaft coupled to the frame member; and a lengthwise moving member coupled to the pair of electrode lead support members and coupled to the lengthwise rotary shaft to move along the lengthwise rotary shaft when the lengthwise rotary shaft rotates so that the pair of electrode lead support members are moved.

In addition, the frame member may include a first frame disposed in the length direction of the battery cell; a second frame spaced apart from the first frame to form a space between the first frame and the second frame and disposed in the length direction of the battery cell; a third frame configured to connect a first end of the first frame to a first end of the second frame; and a fourth frame configured to connect a second end of the first frame to a second end of the second frame at a location opposite to the third frame, and the lengthwise rotary shaft may be disposed in the length direction of the battery cell inside the space between the first frame and the second frame.

Also, the battery transporting apparatus may further comprise a lengthwise rotating member coupled to the lengthwise rotary shaft to rotate the lengthwise rotary shaft, a first side of the lengthwise rotary shaft may be coupled to the fourth frame and a second side of the lengthwise rotary shaft may be fixed to the lengthwise rotating member, and the lengthwise rotary shaft may rotate in association with the rotation of the lengthwise rotating member.

In addition, the lengthwise moving member may be provided in a pair so that the pair of lengthwise moving members are respectively coupled to the pair of electrode lead support members, and the pair of lengthwise moving members may move along the lengthwise rotary shaft so that the pair of electrode lead support members move closer to each other or move away from each other.

Also, the lengthwise rotary shaft may include a lengthwise first thread portion coupled to a first lengthwise moving member among the pair of lengthwise moving members; a lengthwise second thread portion coupled to a second lengthwise moving member among the pair of lengthwise moving members; and a lengthwise non-thread portion provided between the lengthwise first thread portion and the lengthwise second thread portion and having no thread, and the lengthwise first thread portion and the lengthwise second thread portion may have threads formed in opposite directions.

In addition, the lengthwise rotating member may include a lengthwise connector guide coupled and fixed to the third frame; a lengthwise elastic member configured to contact the lengthwise rotary shaft; and a lengthwise connector inserted into the lengthwise connector guide to press the lengthwise elastic member so that the lengthwise elastic member is elastically contracted.

Also, the lengthwise connector may have a perforated hole formed therein, a pressing bar may be provided vertically at an inner side of the lengthwise connector, and the lengthwise elastic member may be inserted into the perforated hole and pressed by the pressing bar.

In addition, the lengthwise connector guide may include a lengthwise first guide having an inner surface of a regular hexagonal shape; and a lengthwise second guide having an inner surface of a circular shape, and the lengthwise connector may include a lengthwise first outer surface portion having an outer surface of a regular hexagonal shape to correspond to the lengthwise first guide; and a lengthwise second outer surface portion having an outer surface of a circular shape to correspond to the lengthwise second guide.

Also, the battery transporting apparatus may further comprise a thickness-wise rotary shaft coupled to the frame member; and a thickness-wise moving member coupled to the cell support member and coupled to the thickness-wise rotary shaft, the thickness-wise rotary shaft is configured to move along the thickness-wise rotary shaft when the thickness-wise rotary shaft rotates so that the cell support member is moved.

In addition, the cell support member may include a first support member having a plurality of first support portions spaced apart from each other at preset intervals, each of the plurality of first support portions having a hollow; and a second support member having a plurality of second support portions spaced apart from each other at preset intervals, the second support member may be smaller than the first support member, and the plurality of second support portions may be inserted into the hollows of the plurality of first support portions to move through the hollows.

Also, each of the plurality of first support portions may include a first straight section formed vertically; a second straight section spaced apart from the first straight section and formed vertically; and a third straight section configured to connect the first straight section and the second straight section, and the second support portion may be inserted into a hollow formed by the first straight section, the second straight section and the third straight section.

In addition, the battery transporting apparatus may further comprise a widthwise moving unit coupled to the frame supporting adjustable member to move the frame supporting adjustable member; and a support unit coupled to the frame supporting adjustable member.

Also, the frame supporting adjustable member may include a first adjustable member having a first side coupled to the widthwise moving unit and a second side coupled to the frame member; and a second adjustable member disposed to intersect with the first adjustable member and coupled to the first adjustable member, the second adjustable member having a first side coupled to the frame member and a second end coupled to the support unit, and the first adjustable member and the second adjustable member may be formed with a straight shape to intersect with each other at center portions thereof and be fixed at the center portions.

In addition, the support unit may have a first guide hole formed in a direction perpendicular to the width direction of the battery cell, and a first end of the first adjustable member may be inserted into the first guide hole to move along the first guide hole and a second end of the first adjustable member may move in the width direction of the battery cell.

Advantageous Effects

According to embodiments of the present disclosure, since the pair of electrode lead support members respectively supporting the electrode leads of the battery cell are adjustable in the length direction of the battery cell, it is possible to transport battery cells having various sizes in the length direction of the battery cell.

In addition, since the cell support member supporting the center portion of the battery cell is adjustable in the thickness direction of the battery cell, it is possible to transport battery cells having various sizes in the thickness direction of the battery cell by using one transporting device.

In addition, since the frame member supporting the battery cell is adjustable in the width direction, namely in the height direction, by the frame supporting adjustable member, the battery cell may be charged or discharged using one transporting device by moving in the width direction of the battery cell for a charging or discharging device having various heights.

In addition, since the electrode lead support member is moved by the operation of the lengthwise moving member, it is easy to adjust the interval between the pair of electrode lead support members.

In addition, since the first support member and the second support portion of the cell support member are moved by the operation of the thickness-wise moving member, it is easy to adjust the interval between the first support member and the second support member.

In addition, since the frame supporting adjustable member moves in the width direction by the operation of the widthwise moving member, the frame supporting adjustable member may be moved easily.

DESCRIPTION OF DRAWINGS

FIG. 27 is a diagram showing a widthwise connector guide along an arrow H in

FIG. 26.

BEST MODE

Figure 1:
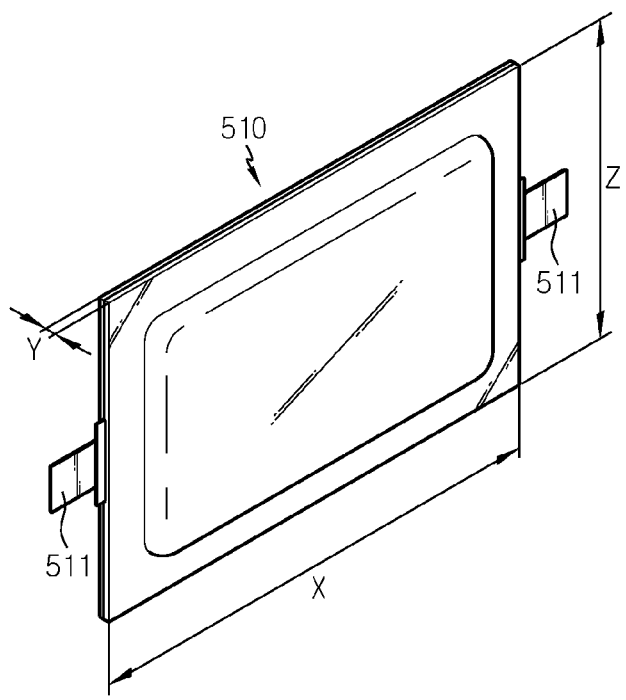
FIG. 1 is a schematic perspective view showing a battery cell that is transported by a battery transporting apparatus according to an embodiment of the present disclosure.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

In the drawings, the size of each element or a specific part of the element may be exaggerated, omitted, or schematically illustrated for convenience and clarity of a description. Thus, the size of each element does not entirely reflect the actual size of the element. A detailed description of well-known functions or elements associated with the present disclosure will be omitted if it unnecessarily obscures the subject matter of the present disclosure.

The term, 'coupling' or 'connecting' as used herein, may refer not only to a case where one member and another member are directly combined or directly connected but also a case where one member is indirectly combined with another member via a connecting member or is indirectly connected.

Figure 2:
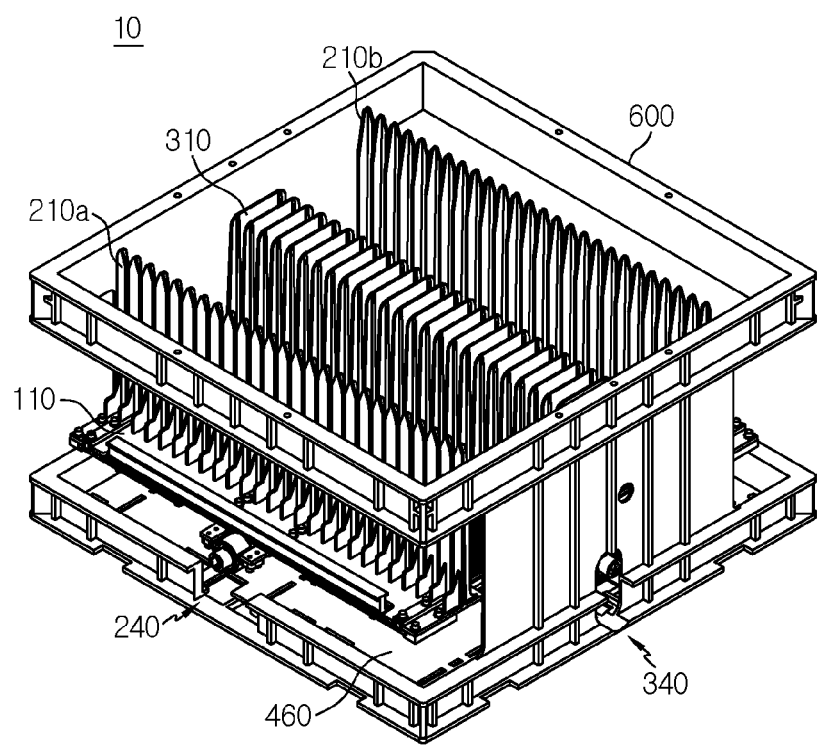
FIG. 2 is a perspective view showing the battery transporting apparatus according to an embodiment of the present disclosure entirely.
Figure 3:
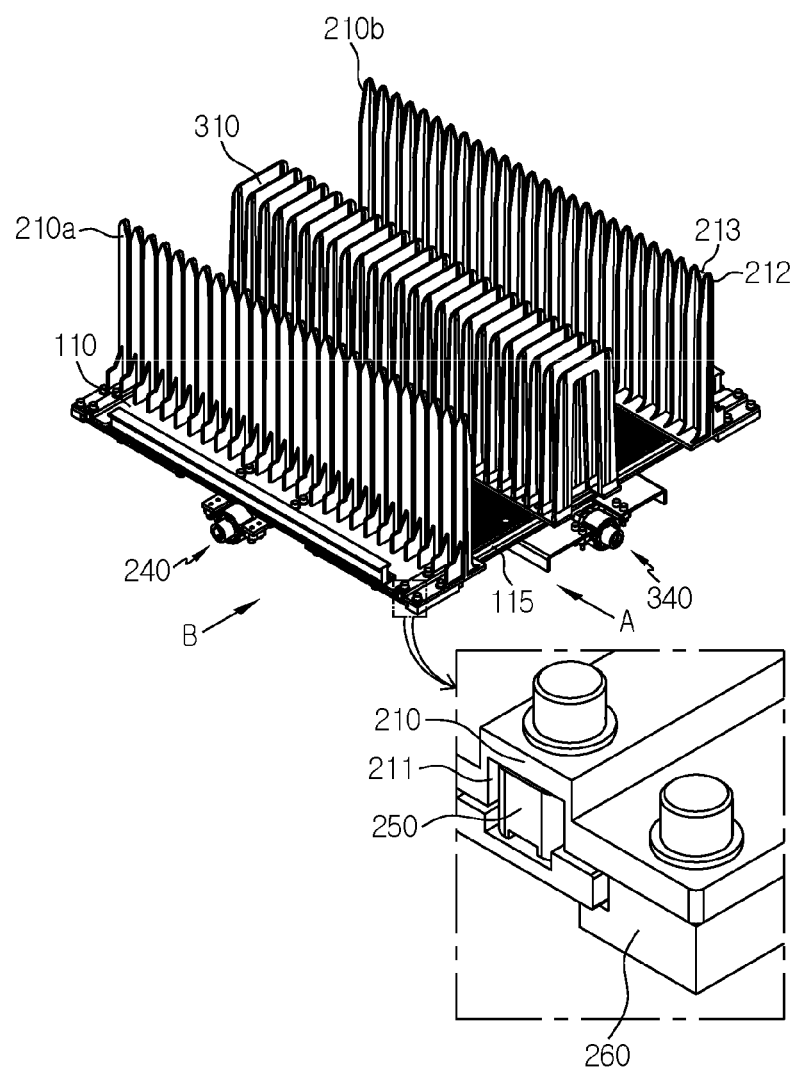
FIG. 3 is a perspective view showing a pair of electrode lead support members and a cell support member of FIG. 2 from which a protecting member is removed.
Figure 4:
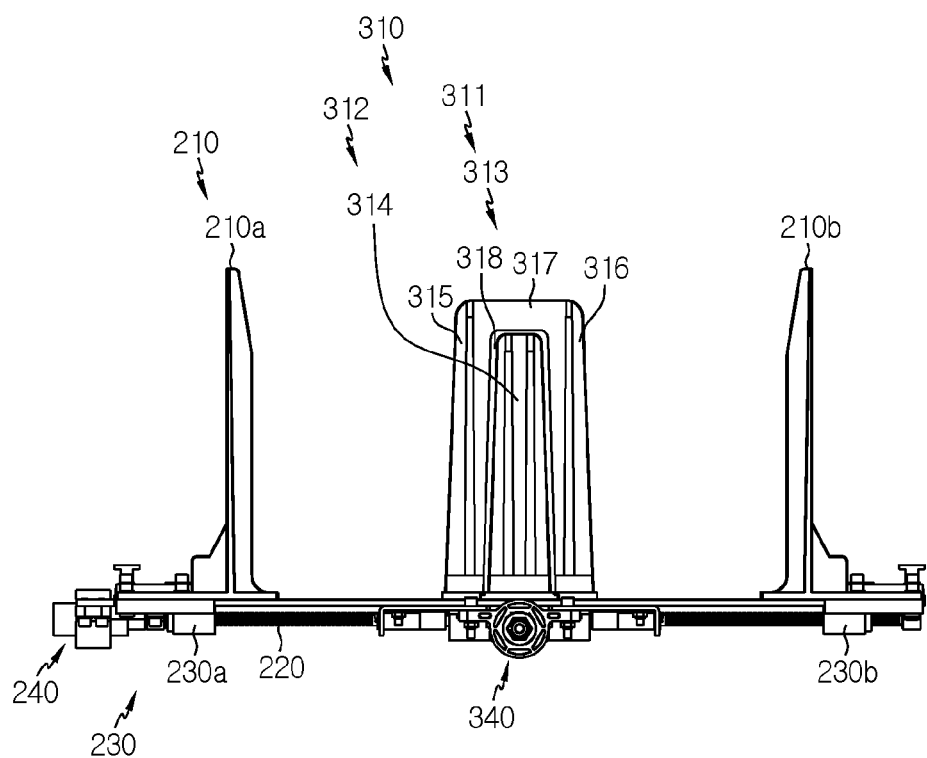
FIG. 4 is a diagram observed along an arrow A of FIG. 3 in which the pair of electrode lead support members are moved away from each other.
Figure 5:
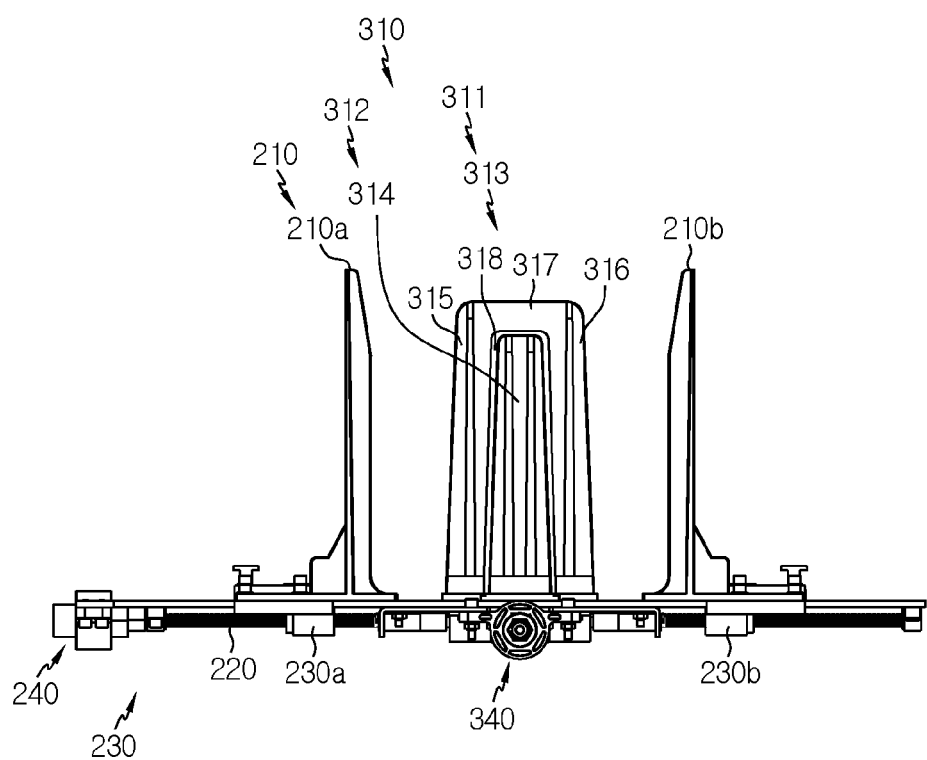
FIG. 5 is a diagram observed along the arrow A of FIG. 3 in which the pair of electrode lead support members are moved closer to each other.
Figure 6:
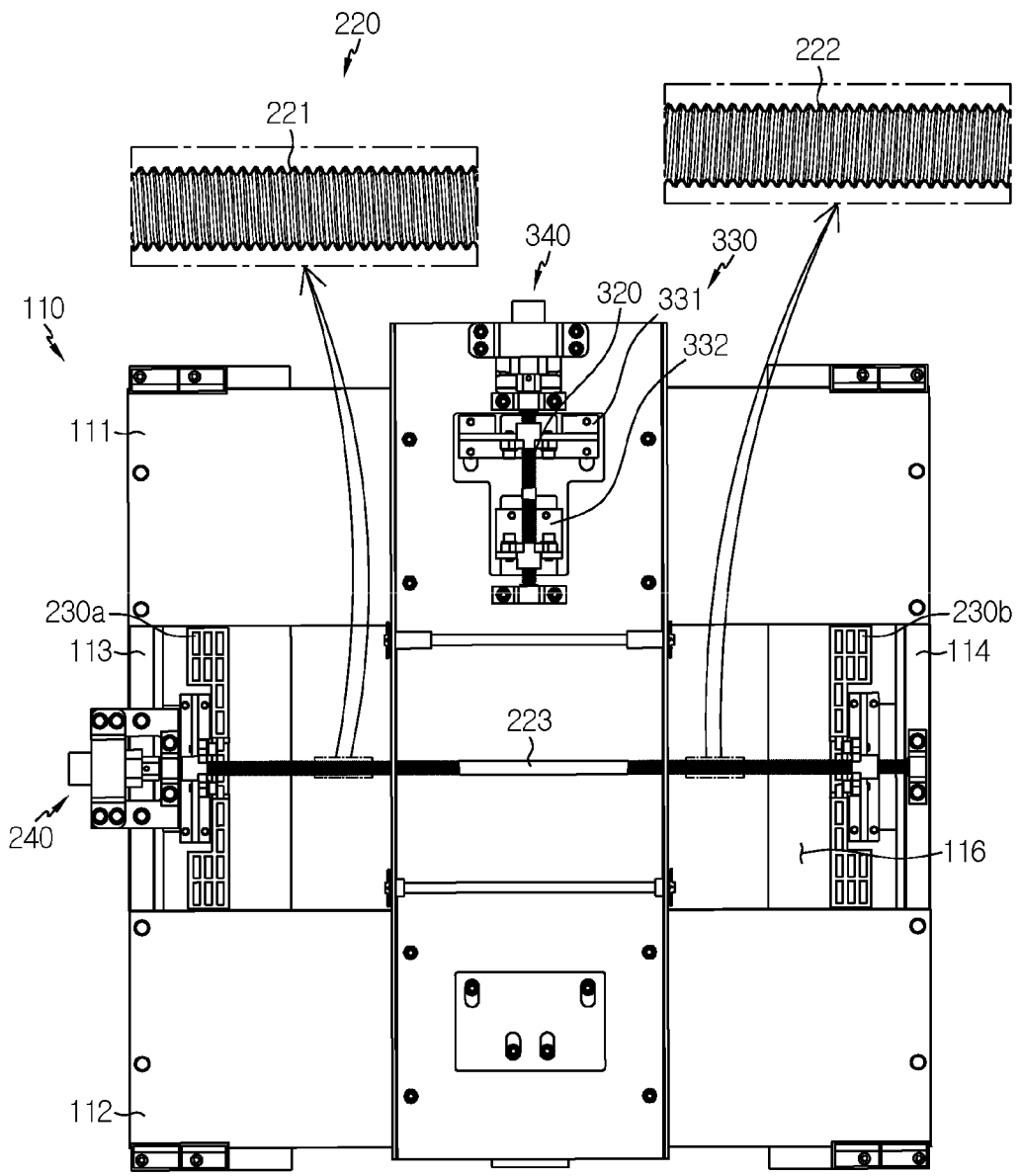
FIG. 6 is a bottom view of FIG. 3 and a partially enlarged view showing a lengthwise rotary shaft.
Figure 7:
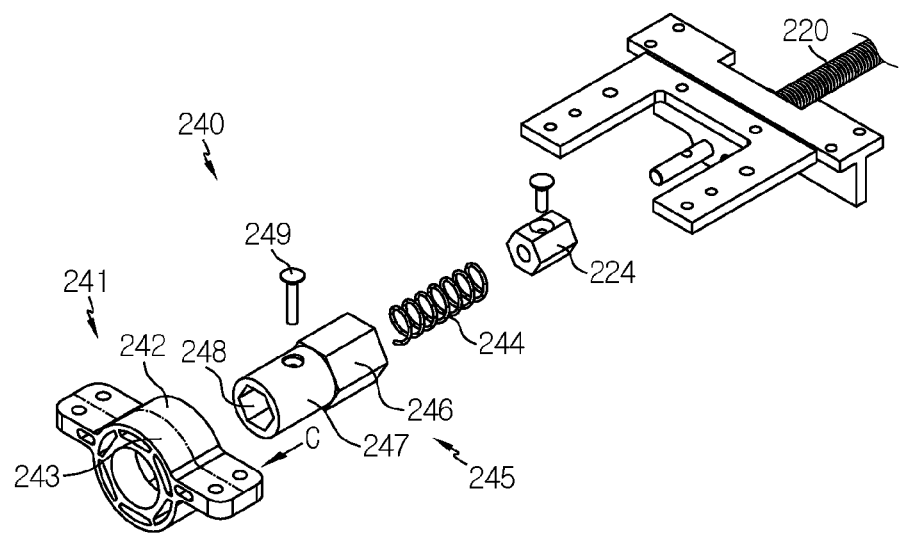
FIG. 7 is an exploded perspective view showing a lengthwise rotating member of the battery transporting apparatus according to an embodiment of the present disclosure.
Figure 8:
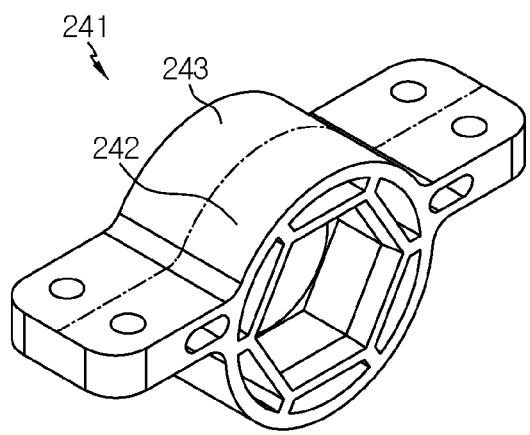
FIG. 8 is a diagram showing a lengthwise connector guide along an arrow C of FIG. 7.
Figure 9:
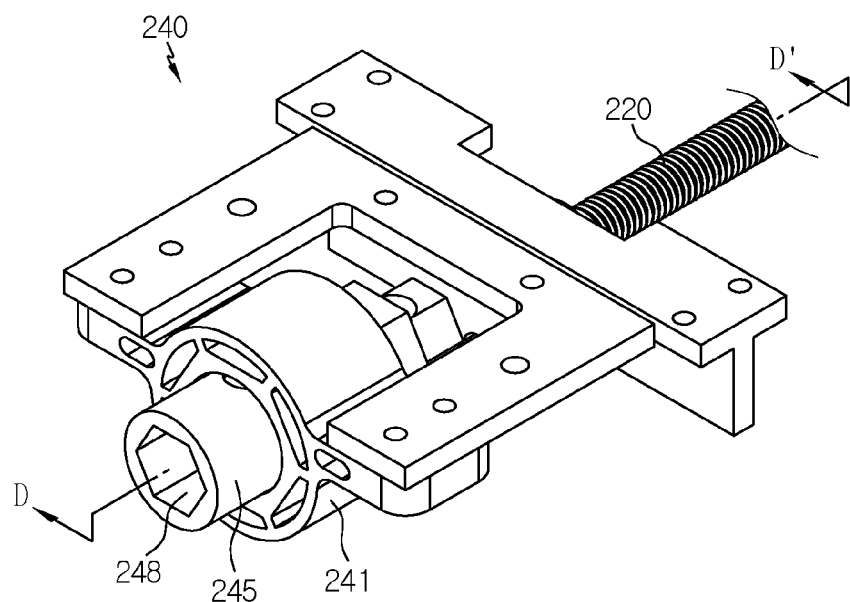
FIG. 9 is an assembled perspective view showing the lengthwise rotating member of FIG. 7.
Figure 10:
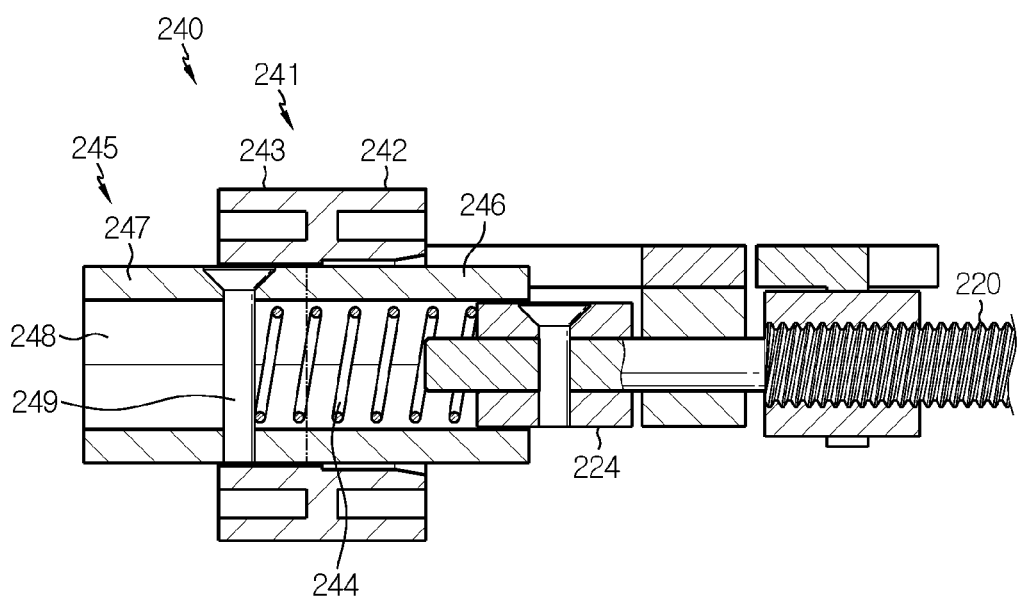
FIG. 10 is a cross-sectioned view, taken along the line D-D' of FIG. 9.
Figure 11:
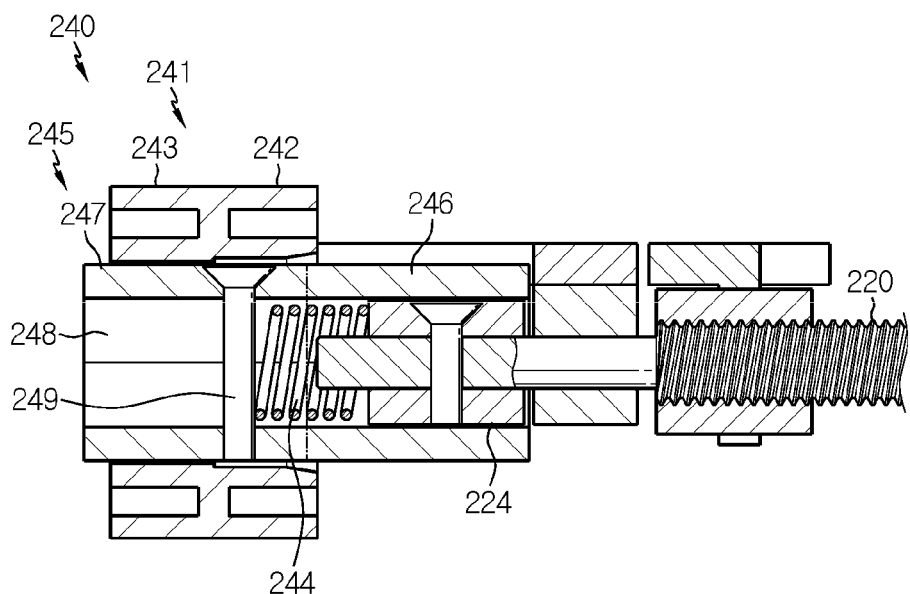
FIG. 11 is a cross-sectioned view showing that the lengthwise connector is moved into the lengthwise connector guide to operate the lengthwise rotating member in FIG. 10.

FIG. 1 is a schematic perspective view showing a battery cell that is transported by a battery transporting apparatus according to an embodiment of the present disclosure, FIG. 2 is a perspective view showing the battery transporting apparatus according to an embodiment of the present disclosure entirely, FIG. 3 is a perspective view showing a pair of electrode lead support members and a cell support member of FIG. 2 from which a protecting member is removed, FIG. 4 is a diagram observed along an arrow A of FIG. 3 in which the pair of electrode lead support members are moved away from each other, FIG. 5 is a diagram observed along the arrow A of FIG. 3 in which the pair of electrode lead support members are moved closer to each other, FIG. 6 is a bottom view of FIG. 3 and a partially enlarged view showing a lengthwise rotary shaft, FIG. 7 is an exploded perspective view showing a lengthwise rotating member of the battery transporting apparatus according to an embodiment of the present disclosure, FIG. 8 is a diagram showing a lengthwise connector guide along an arrow C of FIG. 7, FIG. 9 is an assembled perspective view showing the lengthwise rotating member of FIG. 7, FIG. 10 is a cross-sectioned view, taken along the line D-D' of FIG. 9, and FIG. 11 is a cross-sectioned view showing that the lengthwise connector is moved into the lengthwise connector guide to operate the lengthwise rotating member in FIG. 10.

In this specification, a battery transporting apparatus 10 may have various forms, and may be formed as, for example, a battery transporting tray having a protecting member 600 (see FIG. 2). However, the present disclosure is not limited thereto.

Meanwhile, in this specification, length, width and thickness of the battery cell 510 will be described based on FIG. 1. That is, an X direction of FIG. 1 is a length direction of the battery cell 510, a Y direction of FIG. 1 is a thickness direction of the battery cell 510, and a Z direction of FIG. 1 is a width direction of the battery cell 510.

Figure 22:
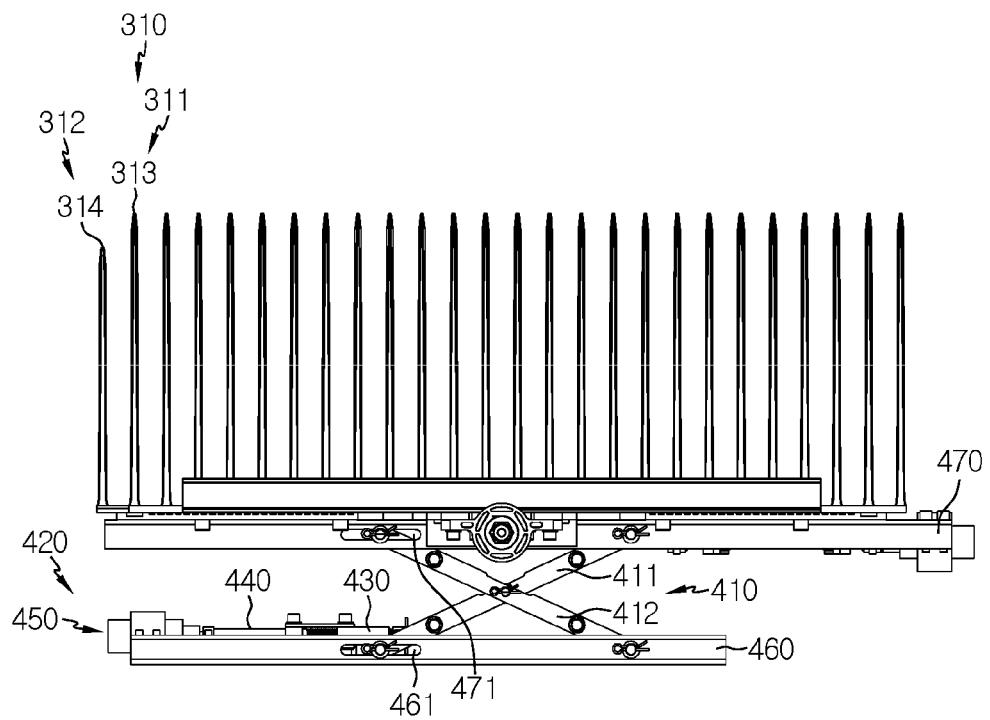
FIG. 22 is a diagram observed along an arrow G of FIG. 21, where the pair of electrode lead support members are removed in FIG. 21.

Referring to the drawings, the battery transporting apparatus 10 according to an embodiment of the present disclosure includes a frame member 110, a pair of electrode lead support members 210a, 210b, a cell support member 310, and a frame supporting adjustable member 410 (see FIG. 22).

The battery transporting apparatus 10 according to an embodiment of the present disclosure is adjustable in the length direction, the width direction and the thickness direction of the battery cell 510.

First, the adjustment of the battery transporting apparatus 10 in the length direction of the battery cell 510 will be described.

The frame member 110 is provided to support the battery cell 510. The battery cell 510 may have various structures, and an electrode lead 511 is provided thereto. The electrode lead 511 provided to the battery cell 510 is a type of terminal exposed to the outside and connected to an external device, and may be made of a conductive material.

The electrode lead 511 includes a positive electrode lead and a negative electrode lead. The positive electrode lead and the negative electrode lead may be disposed in opposite directions with respect to the length direction of the battery cell 510, or the positive electrode lead and negative electrode lead may be disposed in the same direction with respect to the length direction of the battery cell 510.

The electrode lead 511 may be electrically coupled to a bus bar. The battery cell 510 may have a structure in which a plurality of unit cells, in each of which a positive electrode plate, a separator and a negative electrode plate are arranged in order, or a plurality of bi-cells, in each of which a positive electrode plate, a separator, a negative electrode plate, a separator, a positive electrode plate, a separator and a negative electrode plate are arranged in order, are stacked suitable for a battery capacity.

The battery cell 510 may be provided in various forms, but for convenience of explanation, it will be described that the battery cell 510 is a pouch-type battery cell as shown in FIG. 1.

The frame member 110 may support the battery cell 510 in various ways. For example, an electrode lead support member 210 may be mounted to the frame member 110, and the electrode lead support member 210 mounted to the frame member 110 may be configured to support the electrode lead 511 of the battery cell 510. In addition, the cell support member 310 may be mounted to the frame member 110 to support a center portion of the battery cell 510.

Referring to FIG. 6, the frame member 110 may include a first frame 111, a second frame 112, a third frame 113 and a fourth frame 114. The frame member 110 may be formed in various shapes and, for example, may be formed in a square shape. However, the shape of the frame member 110 is not limited thereto.

The first frame 111 and the second frame 112 may be arranged in a length direction of the battery cell 510. Here, the second frame 112 is spaced apart from the first frame 111, and thus, a space 116 of a preset range (see FIG. 6) is formed between the first frame 111 and the second frame 112. In addition, a lengthwise rotary shaft 220, explained later, is arranged in the length direction of the battery cell 510 inside the space 116 between the first frame 111 and the second frame 112.

The third frame 113 connects one ends of the first frame 111 and the second frame 112, and the fourth frame 114 connects the other ends of the first frame 111 and the second frame 112 at a location opposite to the third frame 113.

The electrode lead support member 210 is provided in a pair, and the pair of electrode lead support members 210 support electrode leads 511 of the battery cell 510, respectively. Referring to FIG. 3, the electrode lead support member 210 may have a plurality of guide slots 212, and the electrode lead 511 of the battery cell 510 may be placed in a guide groove 213 formed between the plurality of guide slots 212.

The electrode lead support member 210 is movably mounted to the frame member 110. Referring to FIGS. 4 and 5, the lengthwise moving member 230 moves in a state of being coupled to the electrode lead support member 210, and the electrode lead support member 210 moves together with the lengthwise moving member 230. This will be described later in detail.

The pair of electrode lead support members 210a, 210b are adjustable in the length direction of the battery cell 510 among length, width and thickness directions of the battery cell 510. If the pair of electrode lead support members 210a, 210b are adjustable as above, battery cells 510 of various sizes, especially battery cells 510 of various sizes in the length direction, will be accommodated and supported by the pair of electrode lead support members 210a, 210b.

The lengthwise rotary shaft 220 is provided to rotate in a state of being coupled to the frame member 110.

Referring to FIG. 6, a lengthwise first thread portion 221, a lengthwise second thread portion 222 and a lengthwise non-thread portion 223 may be formed at the lengthwise rotary shaft 220.

In addition, the lengthwise first thread portion 221 and the lengthwise second thread portion 222 have threads formed with in opposite directions, and the lengthwise non-thread portion 223 having no thread is provided between the lengthwise first thread portion 221 and the lengthwise second thread portion 222.

In addition, one of the pair of lengthwise moving members 230a, 230b is coupled to the lengthwise first thread portion 221, and the other one of the pair of lengthwise moving members 230a, 230b is coupled to the lengthwise second thread portion 222.

Here, if the lengthwise rotary shaft 220 rotates in one direction, as shown in FIG. 5, the pair of lengthwise moving members 230a, 230b move closer to each other, and if the lengthwise rotary shaft 220 rotates in another direction, as in FIG. 4, the pair of lengthwise moving members 230a, 230b move away from each other.

The lengthwise moving member 230 is coupled to the lengthwise rotary shaft 220 to move along the lengthwise rotary shaft 220 when the lengthwise rotary shaft 220 rotates so that the pair of electrode lead support members 210a, 210b are moved. The lengthwise moving member 230 may be provided in a pair, and the pair of lengthwise moving members 230a, 230b are coupled to the pair of electrode lead support members 210a, 210b, respectively.

As described above, as the lengthwise rotary shaft 220 rotates, the pair of lengthwise moving members 230a, 230b coupled to the lengthwise rotary shaft 220 move closer to each other or away from each other.

Here, since the pair of electrode lead support members 210a, 210b are respectively coupled to the pair of lengthwise moving members 230a, 230b, the pair of electrode lead support members 210a, 210b also move as the pair of lengthwise moving members 230a, 230b move.

In other words, if the pair of lengthwise moving members 230a, 230b move closer to each other along the lengthwise rotary shaft 220, the pair of electrode lead support members 210a, 210b also move closer to each other, and if the pair of lengthwise moving members 230a, 230b moves away from each other along the lengthwise rotary shaft 220, the pair of electrode lead support members 210a, 210b also move away from each other.

The lengthwise rotating member 240 is coupled to the lengthwise rotary shaft 220 and is configured to rotate the lengthwise rotary shaft 220. The lengthwise rotary shaft 220 may be rotated in various ways. A worker may manually rotate the lengthwise rotary shaft 220, or a tool may be used to rotate the lengthwise rotary shaft 220. Alternatively, the lengthwise rotating member 240 may be coupled to the lengthwise rotary shaft 220, and the lengthwise rotary shaft 220 may be rotated by means of the lengthwise rotating member 240.

Referring to FIG. 6, one side of the lengthwise rotary shaft 220 is coupled to the fourth frame 114, and the other side of the lengthwise rotary shaft 220 is coupled to the lengthwise rotating member 240. In addition, if the lengthwise rotating member 240 rotates, the lengthwise rotary shaft 220 also rotates in association with the rotation of the lengthwise rotating member 240.

Referring to FIG. 7, the lengthwise rotating member 240 may include a lengthwise connector guide 241, a lengthwise elastic member 244, and a lengthwise connector 245.

The lengthwise connector guide 241 is coupled and fixed to the third frame 113 (see FIG. 6).

The lengthwise connector guide 241 may include a lengthwise first guide 242 and a lengthwise second guide 243. The lengthwise first guide 242 may have an inner surface of a polygonal shape. For example, referring to FIG. 8, the lengthwise first guide 242 may have an inner surface of a regular hexagonal shape. Hereinafter, for convenience of description, it will be described that the inner surface of the lengthwise first guide 242 has a regular hexagonal shape, but the present disclosure is not limited thereto.

In addition, referring to FIG. 7, the lengthwise second guide 243 may have an inner surface of a circular shape. Here, the lengthwise first guide 242 and the lengthwise second guide 243 may have an integrated form or may be detachably formed.

The lengthwise elastic member 244 is inserted into the lengthwise connector 245 to contact the lengthwise rotary shaft 220. The lengthwise elastic member 244 transmits an elastic recovery force to the lengthwise connector 245. This will be described later in detail.

The lengthwise connector 245 is inserted into the lengthwise connector guide 241 and presses the lengthwise elastic member 244 so that the lengthwise elastic member 244 is elastically contracted. For example, a perforated hole 248 is formed in the lengthwise connector 245, and the lengthwise elastic member 244 is inserted into the perforated hole 248. In addition, a pressing bar 249 is provided vertically to an inner side of the lengthwise connector 245. As shown in FIG. 11, when the lengthwise connector 245 is inserted into the lengthwise connector guide 241, the pressing bar 249 presses the lengthwise elastic member 244.

A lengthwise first outer surface portion 246 and a lengthwise second outer surface portion 247 may be formed at the lengthwise connector 245. The lengthwise first outer surface portion 246 has an outer surface of a regular hexagonal shape to correspond to the lengthwise first guide 242. Here, the outer surface of the lengthwise first outer surface portion 246 is not limited to the regular hexagonal shape, and may have various shapes to correspond to the shape of the inner surface of the lengthwise first guide 242. In addition, the lengthwise second outer surface portion 247 has an outer surface of a circular shape to correspond to the lengthwise second guide 243.

When a tool such as a hexagonal wrench is coupled to the lengthwise connector 245 to give a pressure, the pressing bar 249 provided to the lengthwise connector 245 elastically contracts the lengthwise elastic member 244 as shown in FIG. 11, and the lengthwise second outer surface portion 247 having an outer surface of a circular shape moves to the lengthwise first guide 242. Here, since the lengthwise first outer surface portion 246 having an outer surface of a regular hexagonal shape moves from the lengthwise first guide 242, the lengthwise connector 245 may be rotated.

At this time, a hexagonal coupling portion 224 having a regular hexagonal shape is formed at an end of the lengthwise rotary shaft 220, and a regular hexagon is also formed at the lengthwise connector 245 to which the hexagonal coupling portion 224 of the lengthwise rotary shaft 220 is coupled. That is, at least a portion of the perforated hole 248 of the lengthwise connector 245, for example a portion coupled to the hexagonal coupling portion 224 of the lengthwise rotary shaft 220, is formed to have a regular hexagonal shape.

Therefore, if a tool such as a hexagonal wrench is coupled to the lengthwise connector 245 to give a pressure, the perforated hole 248 of the lengthwise connector 245 formed in a regular hexagonal shape moves so as to be coupled to the hexagonal coupling portion 224 of the lengthwise rotary shaft 220 more deeply (see FIGS. 10 and 11).

In addition, if the lengthwise connector 245 is rotated using a tool such as a hexagonal wrench, the lengthwise rotary shaft 220 coupled to the lengthwise connector 245 also rotates together with the lengthwise connector 245.

In addition, if the lengthwise rotary shaft 220 stops rotating, the hexagonal wrench is removed from the lengthwise connector 245. If the hexagonal wrench is removed from the lengthwise connector 245, in a state where the lengthwise elastic member 244 is in contact with the pressing bar 249 of the lengthwise connector 245, the elastic recovery force of the lengthwise elastic member 244 is provided to the pressing bar 249, as shown in FIG. 10. Thus, the lengthwise first outer surface portion 246 of the lengthwise connector guide 241 moves to the lengthwise first guide 242 of the lengthwise connector guide 241 and is inserted therein.

Here, since the outer surface of the lengthwise first outer surface portion 246 has a regular hexagonal shape and the inner surface of the lengthwise first guide 242 also has a regular hexagonal shape, if the lengthwise first outer surface portion 246 is inserted into the lengthwise first guide 242, the lengthwise first outer surface portion 246 is prevented from rotating. That is, if the hexagonal wrench is removed from the lengthwise connector 245, the lengthwise connector 245 is caught by the lengthwise connector guide 241 to prevent rotation, and the lengthwise rotary shaft 220 coupled to the lengthwise connector 245 is also prevented from rotating.

That is, if the lengthwise connector 245 is rotated using a tool such as a hexagonal wrench, the lengthwise rotary shaft 220 also rotates together with the lengthwise connector 245, so the interval between the electrode lead support members 210 is adjusted. However, if the tool such as a hexagonal wrench is removed from the lengthwise connector 245, the lengthwise first outer surface portion 246 of the lengthwise connector 245 is coupled to the lengthwise first guide 242 of the lengthwise connector guide 241 to prevent the lengthwise rotary shaft 220 from rotating.

Referring to FIG. 3, a rail-shaped rail groove 115 may be formed at the first frame 111 and the second frame 112, and a first movement guide 250 may be provided to be inserted into the rail-shaped rail groove 115 formed at the first frame 111 and the second frame 112 and move along the rail groove 115.

Here, the electrode lead support member 210 may be coupled to the first movement guide 250 to move together with the first movement guide 250. To this end, an insert groove 211 into which the first movement guide 250 may be inserted may be formed at the electrode lead support member 210.

In addition, a second movement guide 260 may be spaced apart from the first movement guide 250 and coupled to an end of the electrode lead support member 210. For example, the second movement guide 260 may be provided to contact side surfaces of ends of the first frame 111 and the second frame 112 and move along the side surfaces of the ends of the first frame 111 and the second frame 112.

That is, the first movement guide 250 and the second movement guide 260 guide the movement of the electrode lead support member 210 such that the electrode lead support member 210 moves smoothly.

According to the above configuration, the pair of electrode lead support members 210a, 210b respectively supporting the electrode leads 511 of the battery cell 510 are adjustable in the length direction of the battery cell 510. Thus, various battery cells 510 having various sizes in the length direction may be transported using one transporting device.

In addition, since the electrode lead support member 210 is moved by the operation of the lengthwise moving member 230, it is easy to adjust the interval between the pair of electrode lead support members 210a, 210b.

Figure 12:
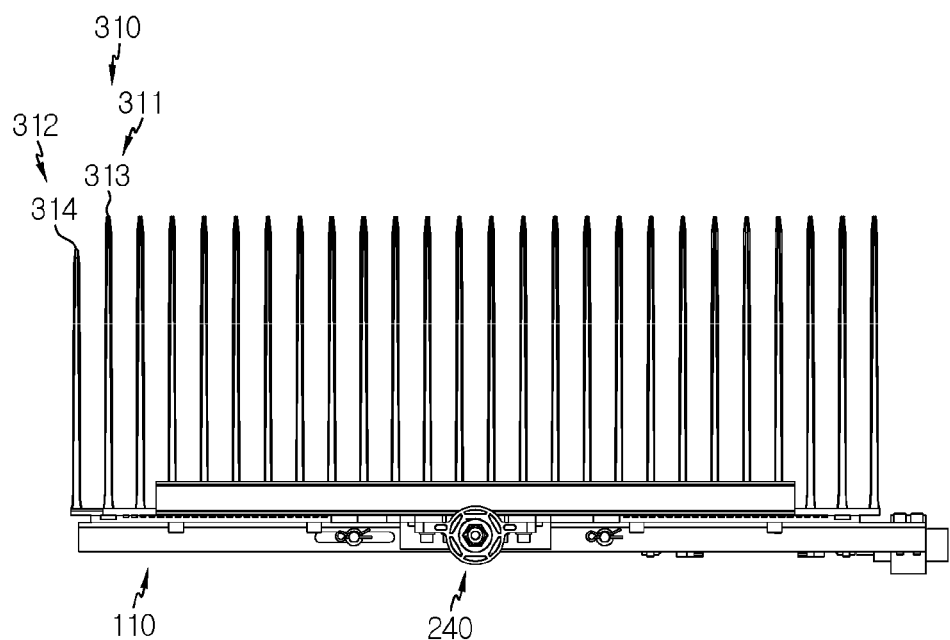
FIG. 12 is a diagram observed along an arrow B of FIG. 3 in which the pair of electrode lead support members are removed in FIG. 3, showing that a first support member and a second support member of the cell support member are moved closer to each other.
Figure 13:
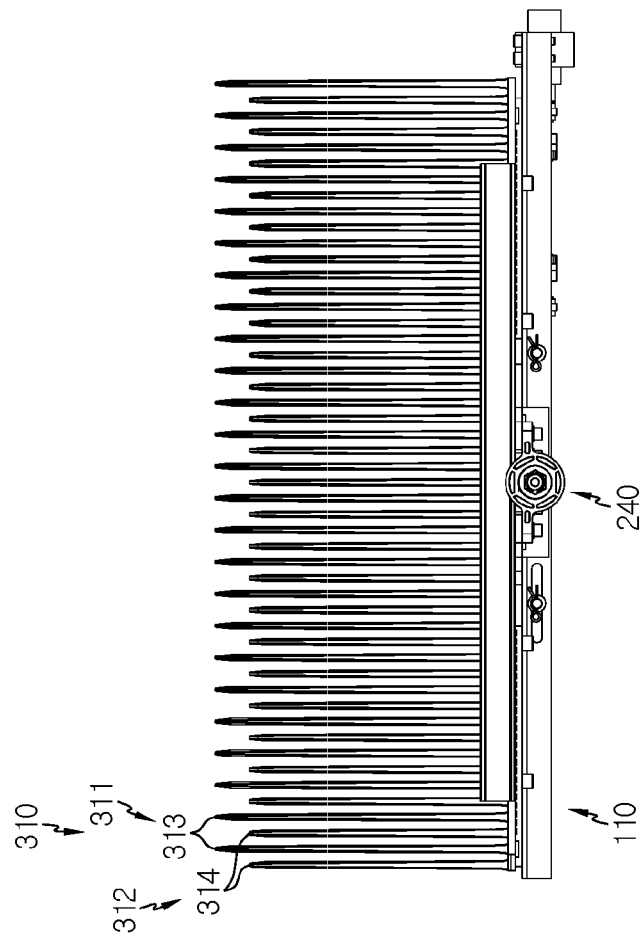
FIG. 13 is a diagram observed along the arrow B of FIG. 3 in which the pair of electrode lead support members are removed in FIG. 3, showing that the first support member and the second support member of the cell support member are moved away from each other.
Figure 14:
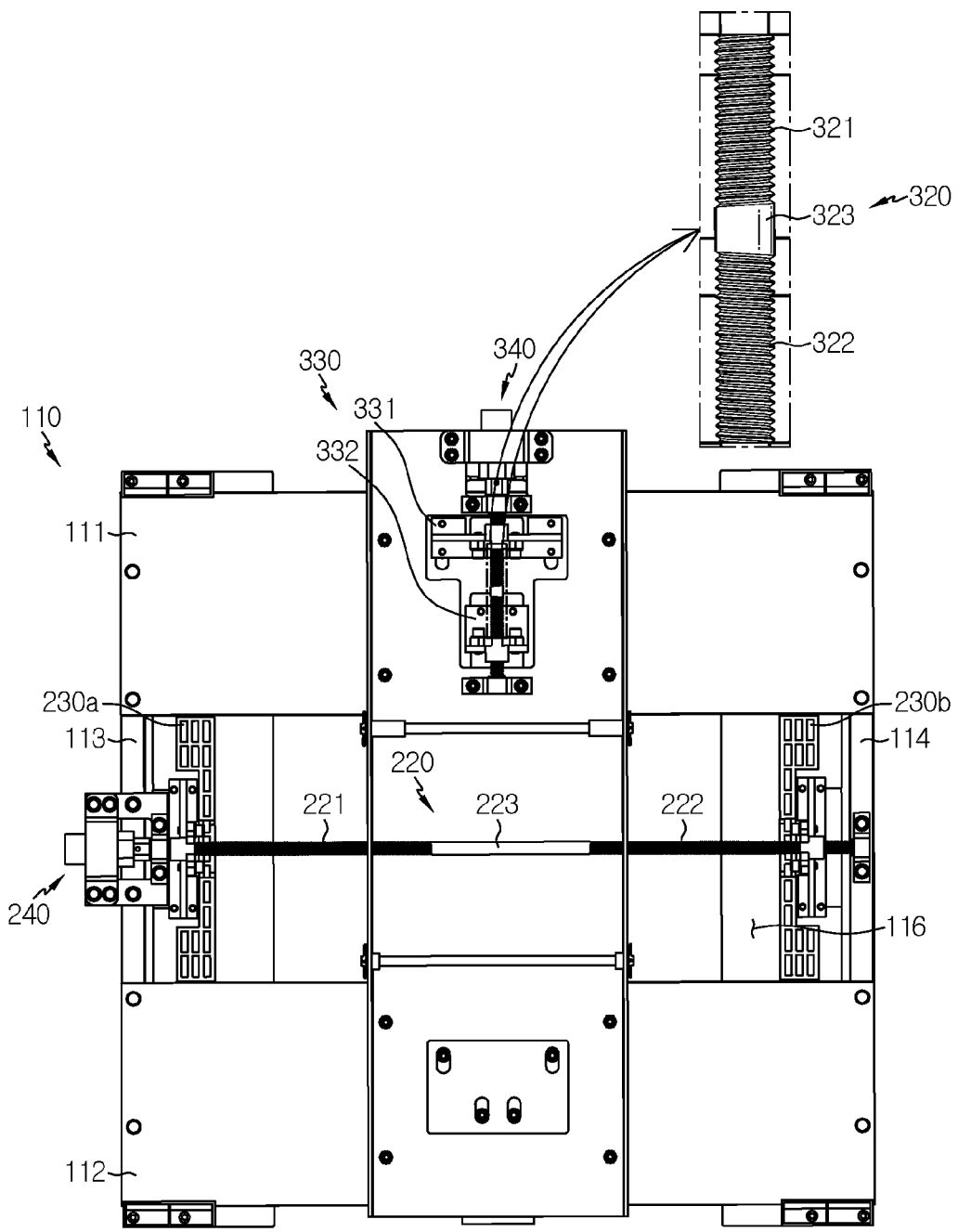
FIG. 14 is a bottom view of FIG. 3 and a partially enlarged view showing a thickness-wise rotary shaft.
Figure 15:
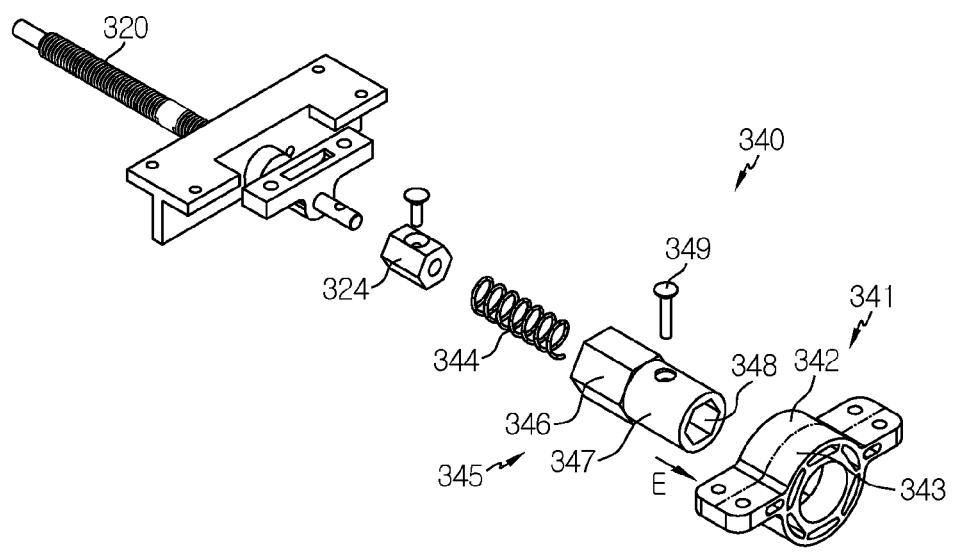
FIG. 15 is an exploded perspective view showing a thickness-wise rotating member of the battery transporting apparatus according to an embodiment of the present disclosure.
Figure 16:
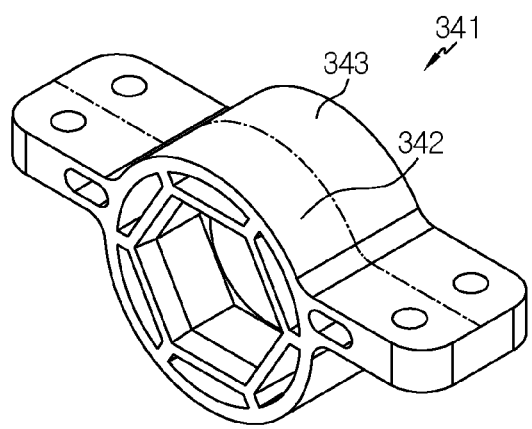
FIG. 16 is a diagram observed along an arrow E of FIG. 15 showing a thickness-wise connector guide.
Figure 17:
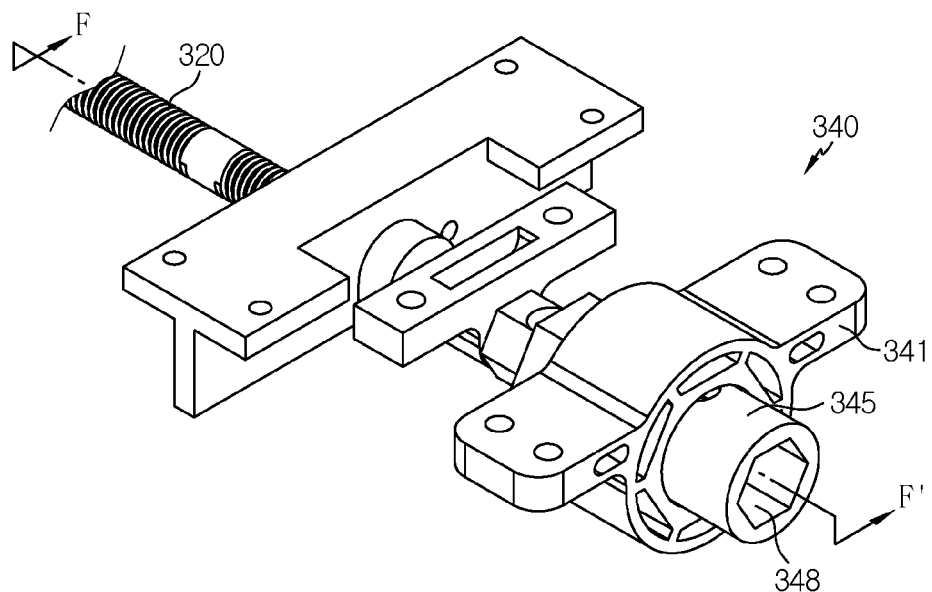
FIG. 17 is an assembled perspective view showing the thickness-wise rotating member of FIG. 15.
Figure 18:
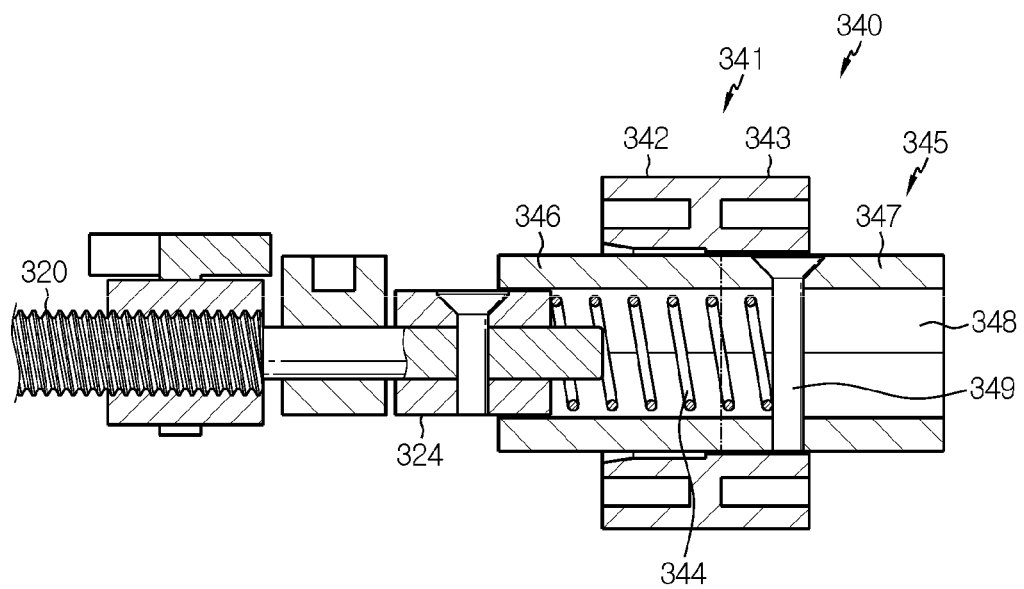
FIG. 18 is a cross-sectioned view, taken along the line F-F' of FIG. 17.
Figure 19:
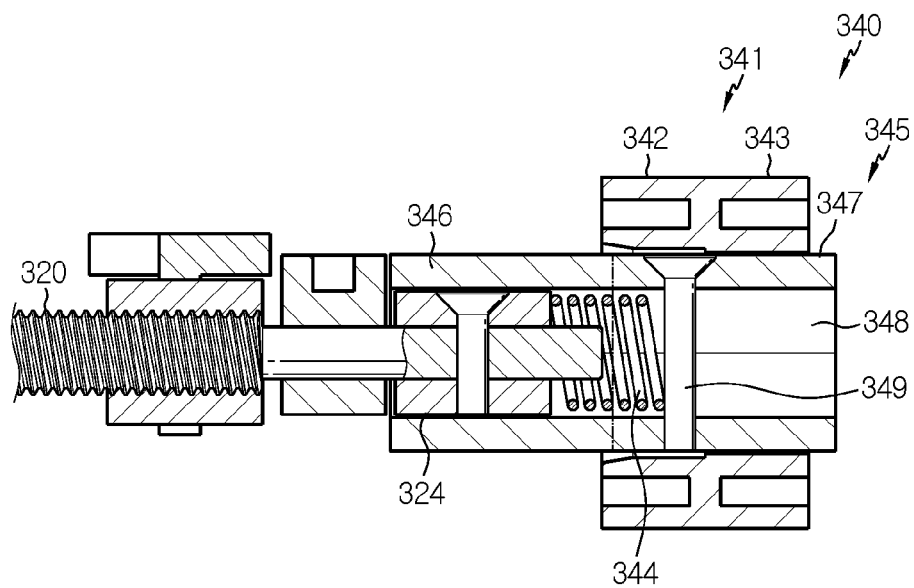
FIG. 19 is a cross-sectioned view showing that the thickness-wise connector is moved into the thickness-wise connector guide to operate the thickness-wise rotating member in FIG. 18.

FIG. 12 is a diagram observed along an arrow B of FIG. 3 in which the pair of electrode lead support members are removed in FIG. 3, showing that a first support member and a second support member of the cell support member are moved closer to each other, FIG. 13 is a diagram observed along the arrow B of FIG. 3 in which the pair of electrode lead support members are removed in FIG. 3, showing that the first support member and the second support member of the cell support member are moved away from each other, FIG. 14 is a bottom view of FIG. 3 and a partially enlarged view showing a thickness-wise rotary shaft, FIG. 15 is an exploded perspective view showing a thickness-wise rotating member of the battery transporting apparatus according to an embodiment of the present disclosure, FIG. 16 is a diagram observed along an arrow E of FIG. 15 showing a thickness-wise connector guide, FIG. 17 is an assembled perspective view showing the thickness-wise rotating member of FIG. 15, FIG. 18 is a cross-sectioned view, taken along the line F-F' of FIG. 17, and FIG. 19 is a cross-sectioned view showing that the thickness-wise connector is moved into the thickness-wise connector guide to operate the thickness-wise rotating member in FIG. 18.

Next, the adjustment of the battery cell 510 in the thickness direction by the battery transporting apparatus 10 will be described.

Referring to FIGS. 2 and 3, the cell support member 310 is movably mounted to the frame member 110 and is adjustable in the thickness direction of the battery cell 510 among length, width and thickness directions of the battery cell 510 and configured to support the center portion of the battery cell 510.

Referring to FIGS. 12 and 13, the cell support member 310 may include a first support member 311 and a second support member 312. Referring to FIG. 4, the first support member 311 may include a plurality of first support portions 313 having a hollow 318 formed therein and spaced apart from each other at preset intervals. For example, the first support portion 313 may include a first straight section 315, a second straight section 316 and a third straight section 317.

The first straight section 315 is formed in the vertical direction. The first straight section 315 may be sloped within a preset range in the vertical direction. The second straight section 316 is spaced apart from the first straight section 315 and formed in the vertical direction. The second straight section 316 may also be sloped within a preset range in the vertical direction. The third straight section 317 connects the first straight section 315 and the second straight section 316. For example, the third straight section 317 may be provided to connect the first straight section 315 and the second straight section 316 at upper sides of the first straight section 315 and the second straight section 316.

Referring to FIG. 4, the second support member 312 may include a plurality of second support portions 314 spaced apart from each other at preset intervals. Here, the second support portion 314 of the second support member 312 may be formed smaller than the first support portion 313 of the first support member 311, and the plurality of second support portions 314 may be inserted into the hollows 318 of the plurality of first support portions 313 to move through the hollows 318.

That is, the second support portion 314 may be inserted into the hollow 318 formed by the first straight section 315, the second straight section 316 and the third straight section 317 of the first support portion 313.

Here, the center portion of the battery cell 510 may be placed and supported between the first support portion 313 and the second support portion 314. That is, if the plurality of second support portions 314 are inserted into the hollows 318 of the plurality of first support portions 313 to move through the hollows 318, as shown in FIGS. 12 and 13, the interval between the first support portion 313 and the second support portion 314 may be adjusted. Thus, battery cells 510 of various sizes, especially various battery cells 510 having various sizes in the thickness direction, may be accommodated and supported between the first support portion 313 and the second support portion 314.

A thickness-wise rotary shaft 320 is configured to rotate in a state of being coupled to the frame member 110.

Referring to FIG. 14, a thickness-wise first thread portion 321, a thickness-wise second thread portion 322 and a thickness-wise non-thread portion 323 may be formed at the thickness-wise rotary shaft 320.

In addition, the thickness-wise first thread portion 321 and the thickness-wise second thread portion 322 have threads formed in opposite directions, and the thickness-wise non-thread portion 323 having no thread is provided between the thickness-wise first thread portion 321 and the thickness-wise second thread portion 322.

In addition, a thickness-wise first moving member 331 is coupled to the thickness-wise first thread portion 321, and a thickness-wise second moving member 332 is coupled to the thickness-wise second thread portion 322.

Here, if the thickness-wise rotary shaft 320 rotates in one direction, the thickness-wise first moving member 331 and the thickness-wise second moving member 332 move closer to each other, and if the thickness-wise rotary shaft 320 rotates in another direction, the thickness-wise first moving member 331 and the thickness-wise second moving member 332 move away from each other.

A thickness-wise moving member 330 is coupled to the thickness-wise rotary shaft 320 to move along the thickness-wise rotary shaft 320 when the thickness-wise rotary shaft 320 rotates, and is coupled to the cell support member 310 to move the cell support member 310.

The thickness-wise moving member 330 may include a thickness-wise first moving member 331 and a thickness-wise second moving member 332. The thickness-wise first moving member 331 is coupled to the first support member 311 of the cell support member 310. In addition, the thickness-wise second moving member 332 is coupled to the second support member 312 of the cell support member 310.

The thickness-wise first moving member 331 and the thickness-wise second moving member 332 may be coupled to the thickness-wise rotary shaft 320 to move along the thickness-wise rotary shaft 320.

As the thickness-wise rotary shaft 320 rotates, the thickness-wise first moving member 331 and the thickness-wise second moving member 332 coupled to the thickness-wise rotary shaft 320 move closer to each other or move away from each other.

Here, since the first support member 311 of the cell support member 310 is coupled to the thickness-wise first moving member 331 and the second support member 312 of the cell support member 310 is coupled to the thickness-wise second moving member 332, as the thickness-wise first moving member 331 and the thickness-wise second moving member 332 move, the first support member 311 and the second support member 312 of the cell support member 310 also move.

That is, if the thickness-wise first moving member 331 and the thickness-wise second moving member 332 move closer to each other along the thickness-wise rotary shaft 320, the first support member 311 and the second support member 312 also move closer to each other as shown in FIG. 12, and if the thickness-wise first moving member 331 and the thickness-wise second moving member 332 move away from each other along the thickness-wise rotary shaft 320, the first support member 311 and the second support member 312 also move away from each other as shown in FIG. 13.

A thickness-wise rotating member 340 is coupled to the thickness-wise rotary shaft 320 to rotate the thickness-wise rotary shaft 320. The thickness-wise rotary shaft 320 may be rotated in various ways. A worker may manually rotate the thickness-wise rotary shaft 320, or a tool may be used to rotate the thickness-wise rotary shaft 320. Alternatively, the thickness-wise rotating member 340 may be coupled to the thickness-wise rotary shaft 320, and the thickness-wise rotary shaft 320 may be rotated by means of the thickness-wise rotating member 340.

Here, one side of the thickness-wise rotary shaft 320 may be coupled to the frame member 110, and the other side of the thickness-wise rotary shaft 320 may be coupled to the thickness-wise rotating member 340. In addition, if the thickness-wise rotating member 340 rotates, the thickness-wise rotary shaft 320 also rotates in association with the rotation of the thickness-wise rotating member 340.

Referring to FIG. 15, the thickness-wise rotating member 340 may include a thickness-wise connector guide 341, a thickness-wise elastic member 344 and a thickness-wise connector 345.

The thickness-wise connector guide 341 is coupled and fixed to the frame member 110.

The thickness-wise connector guide 341 may include a thickness-wise first guide 342 and a thickness-wise second guide 343. The thickness-wise first guide 342 may have an inner surface of a polygonal shape. For example, referring to FIG. 16, the thickness-wise first guide 342 may have an inner surface of a regular hexagonal shape. Hereinafter, for convenience of description, it will be described that the inner surface of the thickness-wise first guide 342 has a regular hexagonal shape, but the present disclosure is not limited thereto.

In addition, referring to FIG. 15, the thickness-wise second guide 343 may have an inner surface of a circular shape. Here, the thickness-wise first guide 342 and the thickness-wise second guide 343 may have an integrated form or be detachably formed.

The thickness-wise elastic member 344 is inserted into the thickness-wise connector 345 to contact the thickness-wise rotary shaft 320. The thickness-wise elastic member 344 transmits an elastic recovery force to the thickness-wise connector 345. This will be described later in detail.

The thickness-wise connector 345 is inserted into the thickness-wise connector guide 341 and presses the thickness-wise elastic member 344 so that the thickness-wise elastic member 344 is elastically contracted. For example, a perforated hole 348 is formed in the thickness-wise connector 345, and a thickness-wise elastic member 344 is inserted into the perforated hole 348. In addition, a pressing bar 349 is provided vertically to an inner side of the thickness-wise connector 345. As shown in FIG. 19, when the thickness-wise connector 345 is inserted into the thickness-wise connector guide 341, the pressing bar 349 presses the thickness-wise elastic member 344.

A thickness-wise first outer surface portion 346 and a thickness-wise second outer surface portion 347 may be formed at the thickness-wise connector 345. The thickness-wise first outer surface portion 346 has an outer surface of a regular hexagonal shape to correspond to the thickness-wise first guide 342. Here, the outer surface of the thickness-wise first outer surface portion 346 is not limited to the regular hexagonal shape, and may have various shapes to correspond to the shape of the inner surface of the thickness-wise first guide 342. In addition, the thickness-wise second outer surface portion 347 has an outer surface of a circular shape to correspond to the thickness-wise second guide 343.

When a tool such as a hexagonal wrench is coupled to the thickness-wise connector 345 to give a pressure, referring to FIG. 19, the pressing bar 349 provided to the thickness-wise connector 345 elastically contracts the thickness-wise elastic member 344, and the thickness-wise second outer surface portion 347 having an outer surface of a circular shape moves to the thickness-wise first guide 342. Here, since the thickness-wise first outer surface portion 346 having outer surface of a regular hexagonal shape moves from the thickness-wise first guide 342, the thickness-wise connector 345 may be rotated.

At this time, a hexagonal coupling portion 324 having a regular hexagonal shape is formed at an end of the thickness-wise rotary shaft 320, and a regular hexagon is also formed at the thickness-wise connector 345 to which the hexagonal coupling portion 324 of the thickness-wise rotary shaft 320 is coupled. That is, at least a portion of the perforated hole 348 of the thickness-wise connector 345, for example a portion coupled to the hexagonal coupling portion 324 of the thickness-wise rotary shaft 320, is formed to have a regular hexagonal shape.

Therefore, if a tool such as a hexagonal wrench is coupled to the thickness-wise connector 345 to give a pressure, the perforated hole 348 of the thickness-wise connector 345 formed in a regular hexagonal shape moves so as to be coupled to the hexagonal coupling portion 324 of the thickness-wise rotary shaft 320 more deeply (See FIGS. 18 and 19).

In addition, if the thickness-wise connector 345 is rotated using a tool such as a hexagonal wrench, the thickness-wise rotary shaft 320 coupled to the thickness-wise connector 345 also rotates together with the thickness-wise connector 345.

In addition, if the thickness-wise rotary shaft 320 stops rotating, the hexagonal wrench is removed from the thickness-wise connector 345. If the hexagonal wrench is removed from the thickness-wise connector 345, in a state where the thickness-wise elastic member 344 is in contact with the pressing bar 349 of the thickness-wise connector 345, the elastic recovery force of the thickness-wise elastic member 344 is provided to the pressing bar 349 as shown in FIG. 18. Thus, the thickness-wise first outer surface portion 346 of the thickness-wise connector 345 is moved to the thickness-wise first guide 342 of the thickness-wise connector guide 341 and inserted therein.

Here, since the outer surface of the thickness-wise first outer surface portion 346 has a regular hexagonal shape and the inner surface of the thickness-wise first guide 342 also has a regular hexagon shape, if the thickness-wise first outer surface portion 346 is inserted into the thickness-wise first guide 342, the thickness-wise first outer surface portion 346 is prevented from rotating. That is, if the hexagonal wrench is removed from the thickness-wise connector 345, the thickness-wise connector 345 is caught by the thickness-wise connector guide 341 to prevent rotation, and the thickness-wise rotary shaft 320 coupled to the thickness-wise connector 345 is also prevented from rotating.

In other words, if the thickness-wise connector 345 is rotated using a tool such as a hexagonal wrench, the thickness-wise rotary shaft 320 also rotates together with the thickness-wise connector 345, so the interval between the first support portion 313 and the second support portion 314 of the cell support member 310 is adjusted. However, if the tool such as a hexagonal wrench is removed from the thickness-wise connector 345, the thickness-wise first outer surface portion 346 of the thickness-wise connector 345 is coupled to the thickness-wise first guide 342 of the thickness-wise connector guide 341 to prevent the thickness-wise rotary shaft 320 from rotating.

According to the above configuration, since the cell support member 310 supporting the center portion of the battery cell 510 is adjustable in the thickness direction of the battery cell 510, various battery cells 510 having various sizes in the length direction of the battery cells 510 may be transported using one transporting device.

In addition, since the first support member 311 and the second support portion 314 of the cell support member 310 are moved by the operation of the thickness-wise moving member 330, it is easy to adjust the interval between the first support member 311 and the second support member 312.

Figure 20:
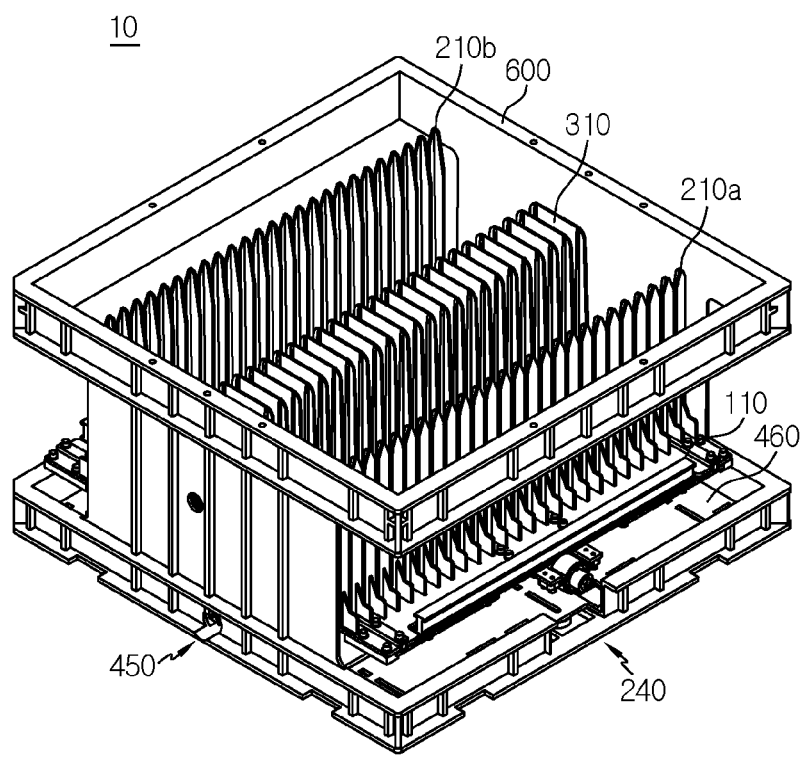
FIG. 20 is a perspective view showing the battery transporting apparatus of FIG. 2 entirely, observed in a different direction.
Figure 21:
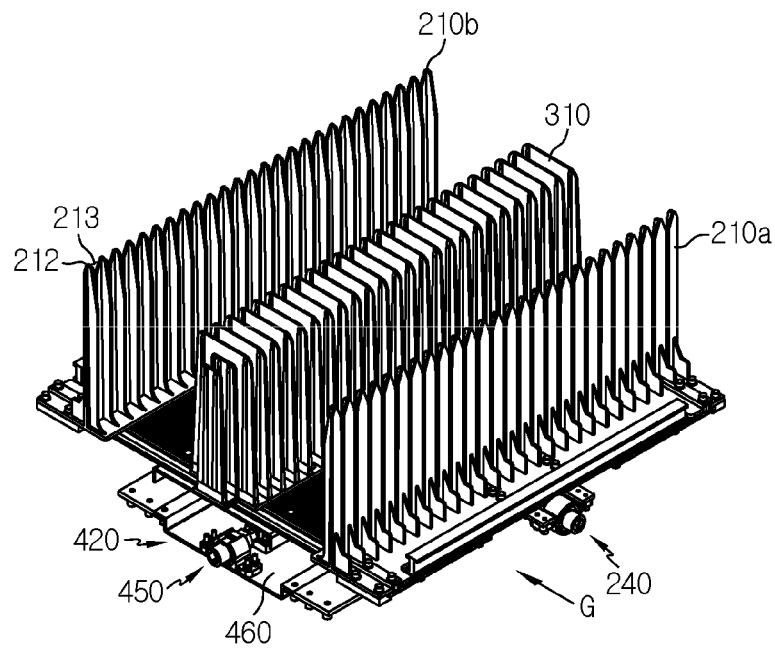
FIG. 21 is a perspective view showing a pair of electrode lead support members, a cell support member and a widthwise moving unit coupled to the frame supporting adjustable member of FIG. 20 from which a protecting member is removed.
Figure 23:
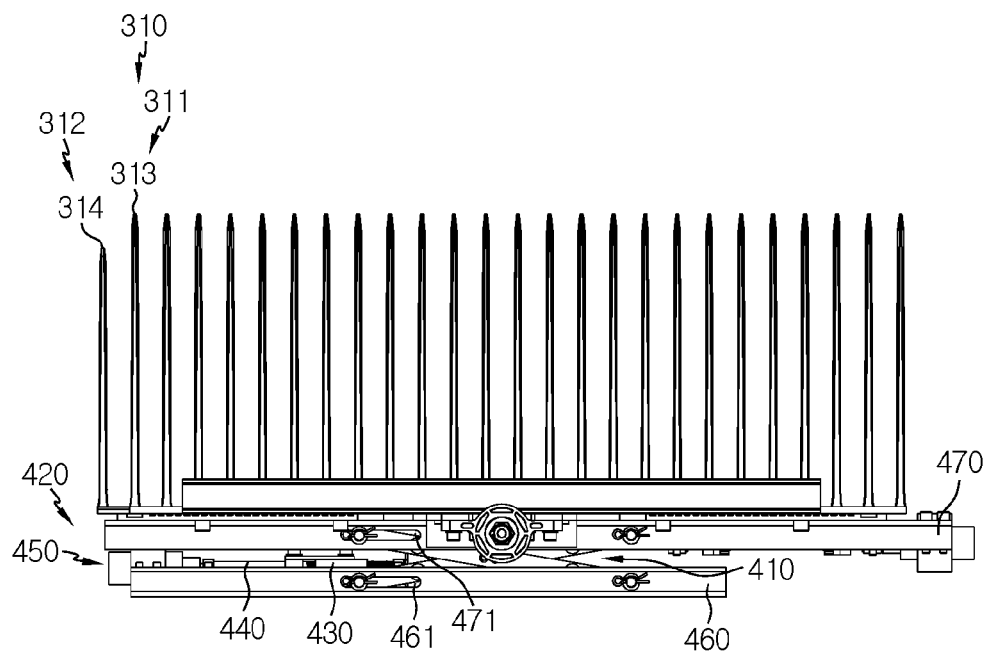
FIG. 23 is a diagram showing that a height is adjusted by moving the frame supporting adjustable member from FIG. 22.
Figure 24:
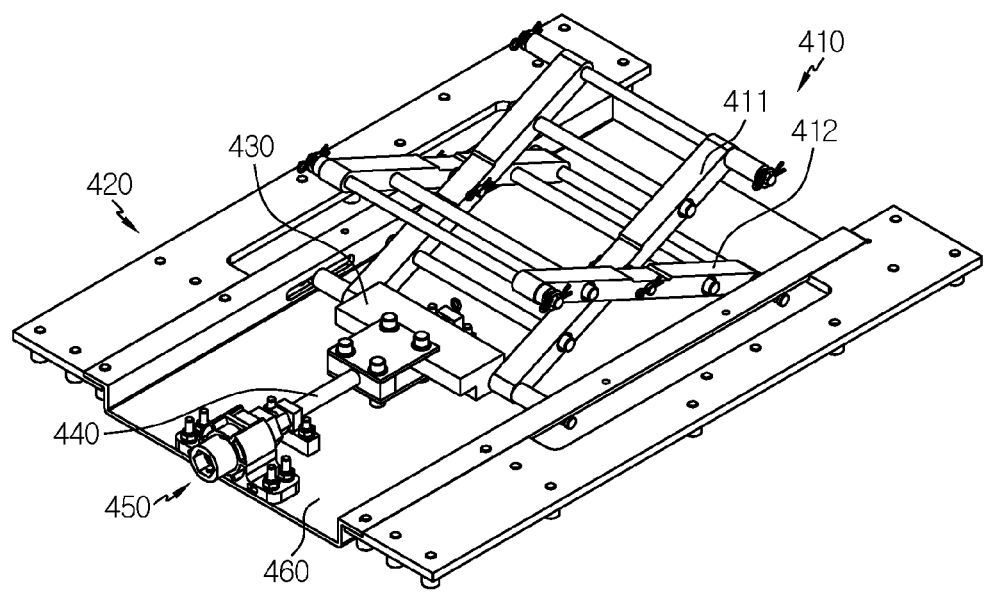
FIG. 24 is a perspective view showing a frame supporting adjustable member and a widthwise moving unit coupled to the support unit in the battery transporting apparatus according to an embodiment of the present disclosure.
Figure 25:
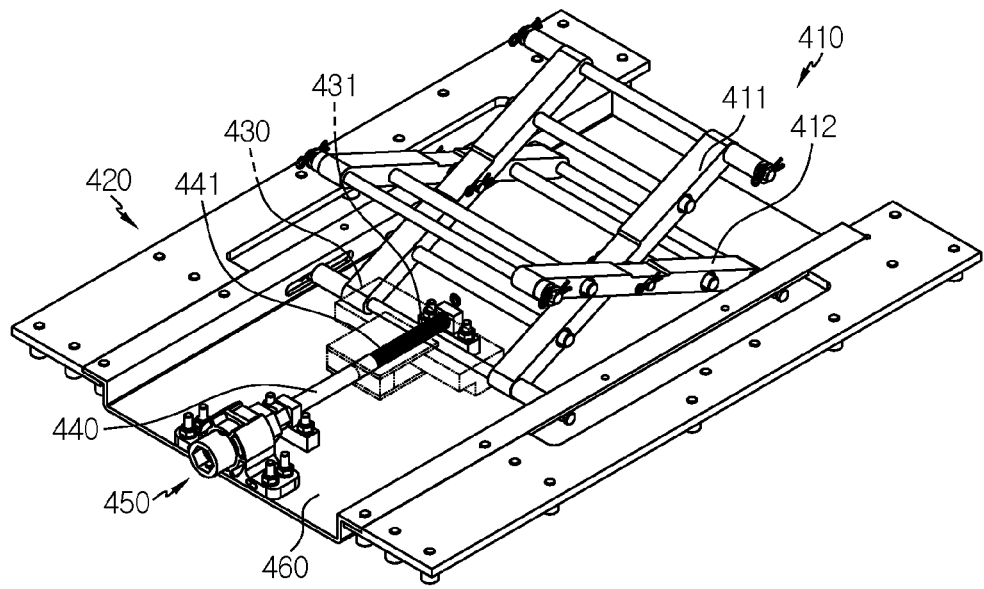
FIG. 25 is a diagram showing a male thread of the widthwise rotary shaft in FIG. 24.
Figure 26:
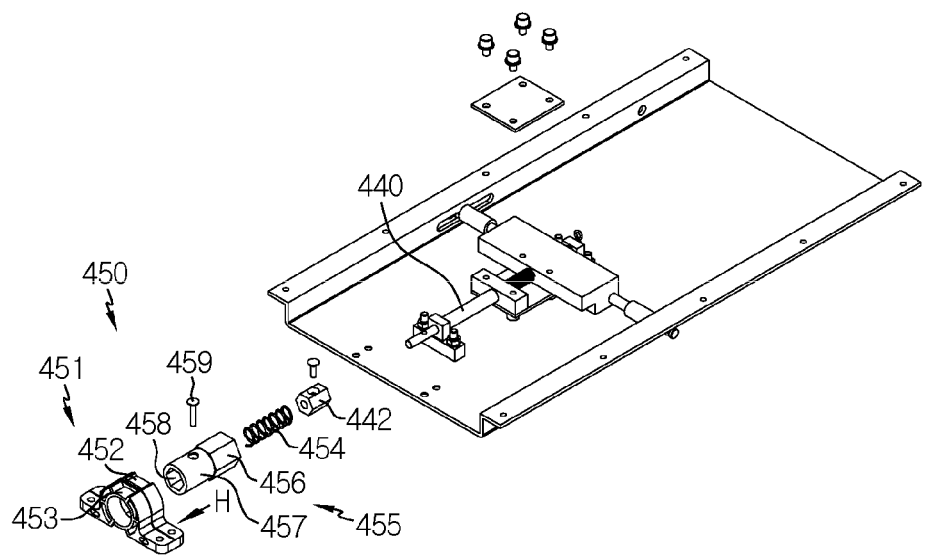
FIG. 26 is an exploded perspective view showing a widthwise rotating member of the battery transporting apparatus according to an embodiment of the present disclosure.
Figure 27:
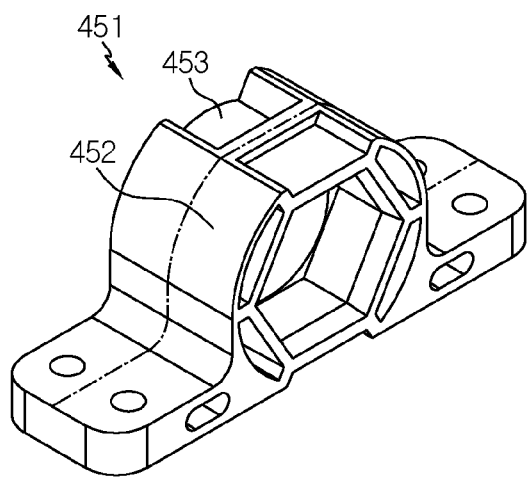
Figure 28:
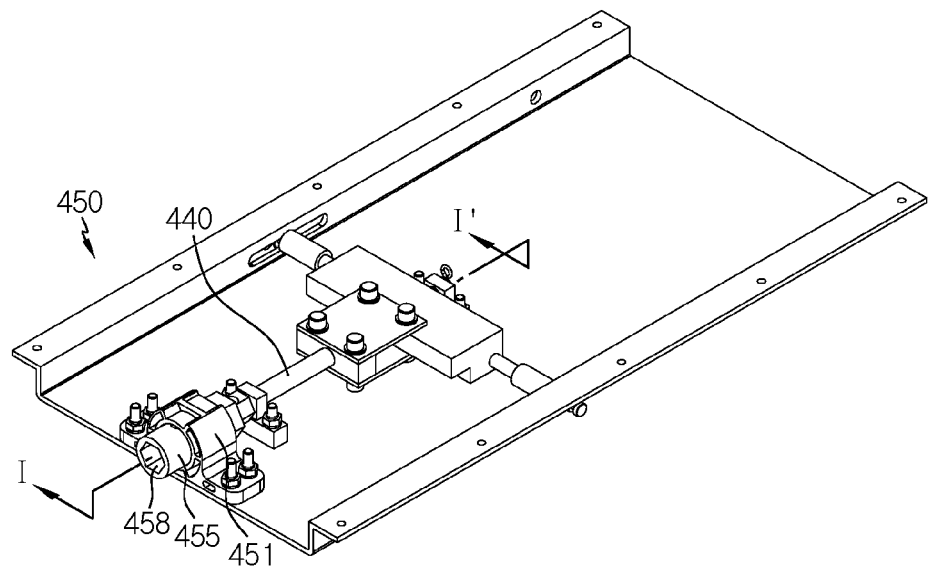
FIG. 28 is an assembled perspective view showing the widthwise rotating member of FIG. 26.
Figure 29:
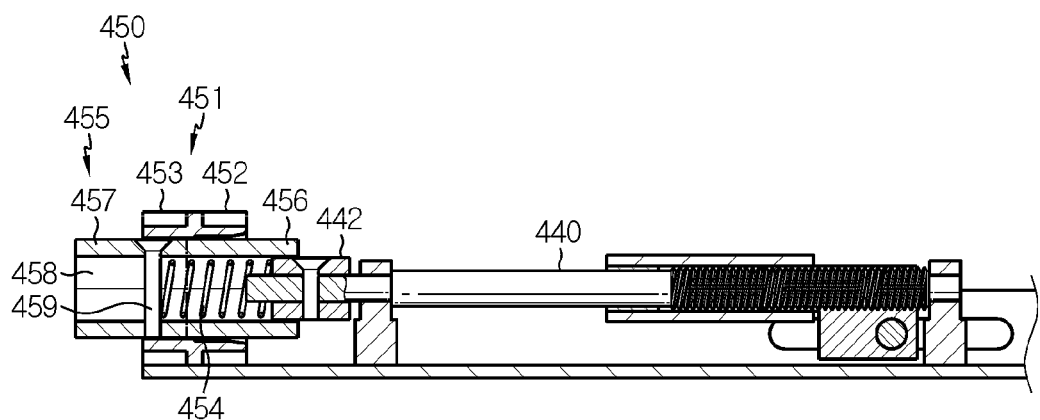
FIG. 29 is a cross-sectioned view, taken along the line I-I' of FIG. 28.
Figure 30:
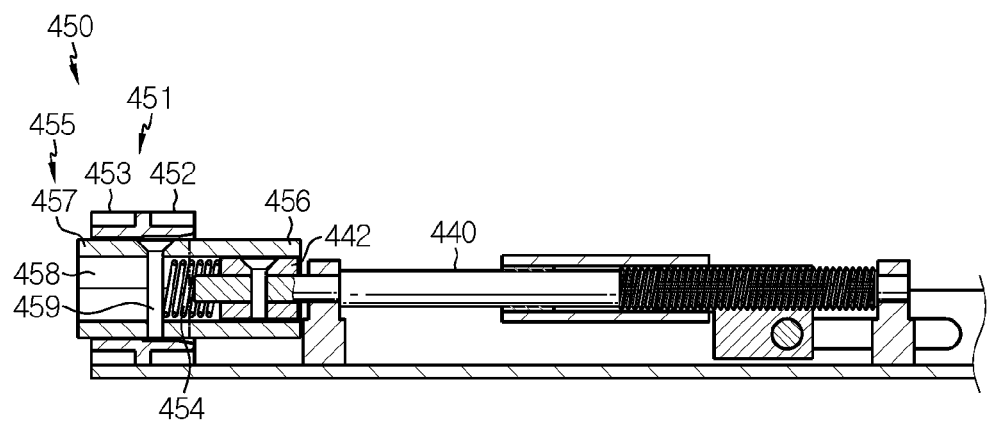
FIG. 30 is a cross-sectioned view showing that the widthwise connector is moved into the widthwise connector guide to operate the widthwise rotating member in FIG. 29.

FIG. 20 is a perspective view showing the battery transporting apparatus of FIG. 2 entirely, observed in a different direction, FIG. 21 is a perspective view showing a pair of electrode lead support members, a cell support member and a widthwise moving unit coupled to the frame supporting adjustable member of FIG. 20 from which a protecting member is removed, FIG. 22 is a diagram observed along an arrow G of FIG. 21, where the pair of electrode lead support members are removed in FIG. 21, FIG. 23 is a diagram showing that a height is adjusted by moving the frame supporting adjustable member from FIG. 22, FIG. 24 is a perspective view showing a frame supporting adjustable member and a widthwise moving unit coupled to the support unit in the battery transporting apparatus according to an embodiment of the present disclosure, FIG. 25 is a diagram showing a male thread of the widthwise rotary shaft in FIG. 24, FIG. 26 is an exploded perspective view showing a widthwise rotating member of the battery transporting apparatus according to an embodiment of the present disclosure, FIG. 27 is a diagram showing a widthwise connector guide along an arrow H in FIG. 26, FIG. 28 is an assembled perspective view showing the widthwise rotating member of FIG. 26, FIG. 29 is a cross-sectioned view, taken along the line I-I' of FIG. 28, and FIG. 30 is a cross-sectioned view showing that the widthwise connector is moved into the widthwise connector guide to operate the widthwise rotating member in FIG. 29.

Next, the adjustment of the battery cell 510 in the width direction by the battery transporting apparatus 10 will be described.

Referring to FIG. 22, the frame supporting adjustable member 410 is coupled to a lower side of the frame member 110 and is configured to be adjustable in the width direction of the battery cell 510 among length, width and thickness directions of the battery cell 510.

The frame supporting adjustable member 410 may include a first adjustable member 411 and a second adjustable member 412. One side of the first adjustable member 411 is coupled to the widthwise moving unit 420, and the other side is coupled to the frame member 110. In addition, the second adjustable member 412 is disposed to intersect with the first adjustable member 411 and is coupled to the first adjustable member 411, so that one side thereof is coupled to the frame member 110 and the other side thereof is coupled to the support unit 460.

The first adjustable member 411 and the second adjustable member 412 may be formed in various ways. For example, the first adjustable member 411 and the second adjustable member 412 may be formed in a straight shape to intersect with each other at center portions thereof, so that the first adjustable member 411 and the second adjustable member 412 are fixed at the intersecting center portion. Accordingly, the first adjustable member 411 and the second adjustable member 412 may be formed in an approximately X-shape, without being limited thereto.

The widthwise moving unit 420 is coupled to the frame supporting adjustable member 410 to move the frame supporting adjustable member 410.

Referring to FIGS. 24 and 25, the widthwise moving unit 420 may include a widthwise moving member 430, a widthwise rotary shaft 440, and a widthwise rotating member 450.

The widthwise moving member 430 may be coupled to the first adjustable member 411 of the frame supporting adjustable member 410 to move in a direction perpendicular to the width direction, for example in a horizontal direction based on FIG. 24.

The widthwise rotary shaft 440 is coupled to the widthwise moving member 430. Here, a female thread 431 may be formed at an inner surface of the widthwise moving member 430, a male thread 441 may be formed at an outer surface of the widthwise rotary shaft 440, and the male thread 441 of the widthwise rotary shaft 440 may be rotatably coupled to the female thread 431 of the widthwise moving member 430.

The widthwise rotating member 450 is coupled to the widthwise rotary shaft 440 to rotate the widthwise rotary shaft 440. If the widthwise rotary shaft 440 is coupled to the widthwise rotating member 450 and rotates, the widthwise moving member 430 coupled to the widthwise rotary shaft 440 moves in a direction perpendicular to the width direction.

The support unit 460 is coupled to the frame supporting adjustable member 410 to support the frame supporting adjustable member 410.

A first guide hole 461 may be formed in the support unit 460 in a direction perpendicular to the width direction. Here, one end of the first adjustable member 411 is inserted into the first guide hole 461 to move along the first guide hole 461, and the other end of the first adjustable member 411 moves in the width direction. In addition, the frame member 110 coupled to the first adjustable member 411 also moves in the width direction.

Since the second adjustable member 412 is fixed to and intersects with the first adjustable member 411 at the center portion thereof, the second adjustable member 412 also operates in association with the operation of the first adjustable member 411. That is, the second adjustable member 412 also moves the frame member 110 in the width direction.

A guide plate 470 may be coupled to the frame member 110 at a lower side of the frame member 110. In this case, one side of the first adjustable member 411 is coupled to the widthwise moving unit 420, and the other side thereof is coupled to the guide plate 470.

A second guide hole 471 may be formed in the guide plate 470 in a direction perpendicular to the width direction. Here, one end of the second adjustable member 412 is coupled to the support unit 460, and the other end of the second adjustable member 412 is inserted into the second guide hole 471 and moves in a horizontal direction along the second guide hole 471 to move the guide plate 470 in the width direction.

The widthwise rotating member 450 is coupled to the widthwise rotary shaft 440 to rotate the widthwise rotary shaft 440. The widthwise rotary shaft 440 may be rotated in various ways. A worker may manually rotate the widthwise rotary shaft 440, or a tool may be used to rotate the widthwise rotary shaft 440. Alternatively, the widthwise rotating member 450 may be coupled to the widthwise rotary shaft 440, and the widthwise rotary shaft 440 may be rotated by means of the widthwise rotating member 450.

One side of the widthwise rotary shaft 440 is coupled to the widthwise moving member 430, and the other side of the widthwise rotary shaft 440 is coupled to the widthwise rotating member 450. In addition, if the widthwise rotating member 450 rotates, the widthwise rotary shaft 440 also rotates in association with the rotation of the widthwise rotating member 450.

Referring to FIG. 26, the widthwise rotating member 450 may include a widthwise connector guide 451, a widthwise elastic member 454, and a widthwise connector 455.

The widthwise connector guide 451 is coupled and fixed to the support unit 460.

The widthwise connector guide 451 may include a widthwise first guide 452 and a widthwise second guide 453. The widthwise first guide 452 may have an inner surface of a polygonal shape. For example, referring to FIG. 27, the widthwise first guide 452 may have an inner surface of a regular hexagonal shape. Hereinafter, for convenience of description, it will be described that the inner surface of the widthwise first guide 452 has a regular hexagonal shape, but the present disclosure is not limited thereto.

In addition, referring to FIG. 26, the widthwise second guide 453 may have an inner surface of a circular shape.

Here, the widthwise first guide 452 and the widthwise second guide 453 may be in an integrated form or may be detachably formed.

The widthwise elastic member 454 is inserted into the widthwise connector 455 to contact the widthwise rotary shaft 440. The widthwise elastic member 454 transmits an elastic recovery force to the widthwise connector 455. This will be described later in detail.

The widthwise connector 455 is inserted into the widthwise connector guide 451 and presses the widthwise elastic member 454 so that the widthwise elastic member 454 is elastically contracted. For example, a perforated hole 458 is formed in the widthwise connector 455, and a widthwise elastic member 454 is inserted into the perforated hole 458. In addition, a pressing bar 459 is provided in the vertical direction at an inner side of the widthwise connector 455. As shown in FIG. 30, when the widthwise connector 455 is inserted into the widthwise connector guide 451, the pressing bar 459 presses the widthwise elastic member 454.

A widthwise first outer surface portion 456 and a widthwise second outer surface portion 457 may be formed at the widthwise connector 455. The widthwise first outer surface portion 456 has an outer surface of a regular hexagonal shape to correspond to the widthwise first guide 452. Here, the outer surface of the widthwise first outer surface portion 456 is not limited to the regular hexagonal shape and may have various shapes to correspond to the shape of the inner surface of the widthwise first guide 452. In addition, the widthwise second outer surface portion 457 has an outer surface of a circular shape to correspond to the widthwise second guide 453.

If a tool such as a hexagonal wrench is coupled to the widthwise connector 455 to give a pressure, the pressing bar 459 provided to the widthwise connector 455 elastically contracts the widthwise elastic member 454 as shown in FIG. 30, and the widthwise second outer surface portion 457 having an outer surface of a circular shape moves to the widthwise first guide 452. Here, since the widthwise first outer surface portion 456 having an outer surface of a regular hexagonal shape moves from the widthwise first guide 452, the widthwise connector 455 may be rotated.

At this time, a hexagonal coupling portion 442 having a regular hexagonal shape is formed at the end of the widthwise rotary shaft 440, and a regular hexagon is also formed at the widthwise connector 455 to which the hexagonal coupling portion 442 of the widthwise rotary shaft 440 is coupled. That is, at least a portion of the perforated hole 458 of the widthwise connector 455, for example a portion coupled to the hexagonal coupling portion 442 of the widthwise rotary shaft 440, is formed to have a regular hexagonal shape.

Therefore, if a tool such as a hexagonal wrench is coupled to the widthwise connector 455 to give a pressure, the perforated hole 458 of the widthwise connector 455 formed in a regular hexagonal shape moves so as to be coupled to the hexagonal coupling portion 442 of the widthwise rotary shaft 440 more deeply (see FIGS. 29 and 30).

In addition, if the widthwise connector 455 is rotated using a tool such as a hexagonal wrench, the widthwise rotary shaft 440 coupled to the widthwise connector 455 also rotates together with the widthwise connector 455.

In addition, if the widthwise rotary shaft 440 stops rotating, the hexagonal wrench is removed from the widthwise connector 455. If the hexagonal wrench is removed from the widthwise connector 455, in a state where the widthwise elastic member 454 is in contact with the pressing bar 459 of the widthwise connector 455, the elastic recovery force of the widthwise elastic member 454 is provided to the pressing bar 459 as shown in FIG. 29. Thus, the widthwise first outer surface portion 456 of the widthwise connector 455 is moved to and inserted into the widthwise first guide 452 of the widthwise connector guide 451.

Here, since the outer surface of the widthwise first outer surface portion 456 has a regular hexagonal shape and the inner surface of the widthwise first guide 452 also has a regular hexagonal shape, if the widthwise first outer surface portion 456 is inserted into the widthwise first guide 452, the widthwise first outer surface portion 456 is prevented from rotating. That is, if the hexagonal wrench is removed from the widthwise connector 455, the widthwise connector 455 is caught by the widthwise connector guide 451 to prevent rotation, and the widthwise rotary shaft 440 coupled to the widthwise connector 455 is prevented from rotating.

That is, if the widthwise connector 455 is rotated using a tool such as a hexagonal wrench, the widthwise rotary shaft 440 also rotates together with the widthwise connector 455, so the height of the frame member 110 is adjusted. However, if the tool such as a hexagonal wrench is removed from the widthwise connector 455, the widthwise first outer surface portion 456 of the widthwise connector 455 is coupled to the widthwise first guide 452 of the widthwise connector guide 451 to prevent the widthwise rotary shaft 440 from rotating.

According to the above configuration, since the frame member supporting the battery cell is adjustable in the width direction, namely in the height direction, by the frame supporting adjustable member, it is possible to charge or discharge the battery cell through one transporting device by moving the battery cell in the width direction of the battery cell, for charging or discharging devices having various heights.

In addition, since the frame supporting adjustable member moves in the width direction by the operation of the widthwise moving member, the frame supporting adjustable member may be moved easily.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

INDUSTRIAL APPLICABILITY

The present disclosure relates to a battery transporting apparatus, and may be used in industries related to batteries.

What is claimed is:

1. A battery transporting apparatus, comprising:
a frame member configured to support a battery cell;
a pair of electrode lead support members movably mounted to the frame member to be adjustable in a length direction of the battery cell among length, width and thickness directions of the battery cell and configured to support electrode leads of the battery cell, respectively;
a cell support member movably mounted to the frame member to be adjustable in the thickness direction of the battery cell and configured to support a center portion of the battery cell;
a frame supporting adjustable member coupled to a lower side of the frame member to be adjustable in the width direction of the battery cell;
a lengthwise rotary shaft coupled to the frame member; and
a lengthwise moving member coupled to the pair of electrode lead support members and coupled to the lengthwise rotary shaft to move along the lengthwise rotary shaft when the lengthwise rotary shaft rotates so that the pair of electrode lead support members are moved,
wherein the lengthwise moving member is provided in a pair so that the pair of lengthwise moving members are respectively coupled to the pair of electrode lead support members, and
the pair of lengthwise moving members move along the lengthwise rotary shaft so that the pair of electrode lead support members move closer to each other or move away from each other.

2. The battery transporting apparatus according to claim 1,
wherein the frame member includes:
a first frame disposed in the length direction of the battery cell;
a second frame spaced apart from the first frame to form a space between the first frame and the second frame and disposed in the length direction of the battery cell;
a third frame configured to connect a first end of the first frame to a first end of the second frame; and
a fourth frame configured to connect a second end of the first frame to a second end of the second frame at a location opposite to the third frame,
wherein the lengthwise rotary shaft is disposed in the length direction of the battery cell inside the space between the first frame and the second frame.

3. The battery transporting apparatus according to claim 2, further comprising:
a lengthwise rotating member coupled to the lengthwise rotary shaft to rotate the lengthwise rotary shaft,
wherein a first side of the lengthwise rotary shaft is coupled to the fourth frame and a second side of the lengthwise rotary shaft is fixed to the lengthwise rotating member, and
the lengthwise rotary shaft rotates in association with the rotation of the lengthwise rotating member.

4. The battery transporting apparatus according to claim 1,
wherein the lengthwise rotary shaft includes:
a lengthwise first thread portion coupled to a first lengthwise moving member among the pair of lengthwise moving members;
a lengthwise second thread portion coupled to a second lengthwise moving member among the pair of lengthwise moving members; and
a lengthwise non-thread portion provided between the lengthwise first thread portion and the lengthwise second thread portion and having no thread, and
wherein the lengthwise first thread portion and the lengthwise second thread portion have threads formed in opposite directions.

5. The battery transporting apparatus according to claim 3,
wherein the lengthwise rotating member includes:
a lengthwise connector guide coupled and fixed to the third frame;
a lengthwise elastic member configured to contact the lengthwise rotary shaft; and
a lengthwise connector inserted into the lengthwise connector guide to press the lengthwise elastic member so that the lengthwise elastic member is elastically contracted.

6. The battery transporting apparatus according to claim 5,
wherein the lengthwise connector has a perforated hole formed therein,
wherein a pressing bar is provided vertically at an inner side of the lengthwise connector, and
wherein the lengthwise elastic member is inserted into the perforated hole and pressed by the pressing bar.

7. The battery transporting apparatus according to claim 6,
wherein the lengthwise connector guide includes:
a lengthwise first guide having an inner surface of a regular hexagonal shape; and
a lengthwise second guide having an inner surface of a circular shape, and
wherein the lengthwise connector includes:
a lengthwise first outer surface portion having an outer surface of a regular hexagonal shape to correspond to the lengthwise first guide; and
a lengthwise second outer surface portion having an outer surface of a circular shape to correspond to the lengthwise second guide.

8. A battery transporting apparatus, comprising:
a frame member configured to support a battery cell;
a pair of electrode lead support members movably mounted to the frame member to be adjustable in a length direction of the battery cell among length, width and thickness directions of the battery cell and configured to support electrode leads of the battery cell, respectively;
a cell support member movably mounted to the frame member to be adjustable in the thickness direction of the battery cell and configured to support a center portion of the battery cell;
a frame supporting adjustable member coupled to a lower side of the frame member to be adjustable in the width direction of the battery cell;
a thickness-wise rotary shaft coupled to the frame member; and
a thickness-wise moving member coupled to the cell support member and coupled to the thickness-wise rotary shaft, the thickness-wise moving member being configured to move along the thickness-wise rotary shaft when the thickness-wise rotary shaft rotates so that the cell support member is moved,
wherein the cell support member includes:
a first support member having a plurality of first support portions spaced apart from each other at preset intervals, each of the plurality of first support portions having a hollow; and
a second support member having a plurality of second support portions spaced apart from each other at preset intervals,
wherein the second support member is smaller than the first support member, and
wherein the plurality of second support portions are inserted into the hollows of the plurality of first support portions to move through the hollows.

9. The battery transporting apparatus according to claim 8,
wherein each of the plurality of first support portions includes:
a first straight section formed vertically;
a second straight section spaced apart from the first straight section and formed vertically; and
a third straight section configured to connect the first straight section and the second straight section,
wherein the second support portion is inserted into a hollow formed by the first straight section, the second straight section and the third straight section.

10. The battery transporting apparatus according to claim 1, further comprising:
a widthwise moving unit coupled to the frame supporting adjustable member to move the frame supporting adjustable member; and
a support unit coupled to the frame supporting adjustable member.

11. The battery transporting apparatus according to claim 10,
wherein the frame supporting adjustable member includes:
a first adjustable member having a first side coupled to the widthwise moving unit and a second side coupled to the frame member; and
a second adjustable member disposed to intersect with the first adjustable member and coupled to the first adjustable member, the second adjustable member having a first side coupled to the frame member and a second side coupled to the support unit, and
wherein the first adjustable member and the second adjustable member are formed with a straight shape to intersect with each other at center portions thereof and are fixed at the center portions.

12. The battery transporting apparatus according to claim 11,
wherein the support unit has a first guide hole formed in a direction perpendicular to the width direction of the battery cell, and
wherein a first end of the first adjustable member is inserted into the first guide hole to move along the first guide hole and a second end of the first adjustable member moves in the width direction of the battery cell.

* * * * *